United States Patent
Nam et al.

(10) Patent No.: US 11,716,124 B2
(45) Date of Patent: Aug. 1, 2023

(54) DYNAMIC SPECTRUM SHARING WITH SPATIAL DIVISION MULTIPLEXING

(71) Applicant: QUALCOMM Incorporated, San Diego, CA (US)

(72) Inventors: Wooseok Nam, San Diego, CA (US); Tao Luo, San Diego, CA (US); Kausik Ray Chaudhuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/349,026

(22) Filed: Jun. 16, 2021

(65) Prior Publication Data
US 2022/0407568 A1   Dec. 22, 2022

(51) Int. Cl.
| | |
|---|---|
| *H04B 7/0452* | (2017.01) |
| *H04W 76/16* | (2018.01) |
| *H04L 5/00* | (2006.01) |
| *H04W 72/04* | (2023.01) |
| *H04W 72/044* | (2023.01) |

(52) U.S. Cl.
CPC ......... *H04B 7/0452* (2013.01); *H04L 5/0025* (2013.01); *H04W 72/046* (2013.01); *H04W 72/0466* (2013.01); *H04W 72/0473* (2013.01); *H04W 76/16* (2018.02)

(58) Field of Classification Search
CPC .. H04B 7/0452; H04W 76/16; H04W 72/046; H04W 72/0466; H04W 72/0473; H04L 5/0025
See application file for complete search history.

(56) References Cited

U.S. PATENT DOCUMENTS

| | | | |
|---|---|---|---|
| 2019/0021048 A1* | 1/2019 | Kadiri | H04W 88/12 |
| 2019/0052582 A1* | 2/2019 | Gaal | H04W 72/042 |
| 2019/0090199 A1* | 3/2019 | Kim | H04W 52/143 |
| 2019/0141770 A1* | 5/2019 | Takahashi | H04W 48/18 |
| 2019/0280757 A1* | 9/2019 | Yang | H04L 5/0053 |
| 2020/0053752 A1* | 2/2020 | Huang | H04W 72/1268 |
| 2020/0170010 A1* | 5/2020 | Luo | H04B 7/15542 |
| 2021/0045174 A1* | 2/2021 | Choi | H04W 72/1263 |
| 2021/0058953 A1* | 2/2021 | Bendlin | H04W 16/14 |
| 2021/0258977 A1* | 8/2021 | Stephenne | H04W 72/044 |
| 2021/0400497 A1* | 12/2021 | Zhou | H04L 5/0082 |
| 2022/0104265 A1* | 3/2022 | Bang | H04W 74/006 |
| 2022/0183006 A1* | 6/2022 | Mauritz | H04L 5/005 |

FOREIGN PATENT DOCUMENTS

WO   WO-2022150180 A1 *   7/2022

* cited by examiner

*Primary Examiner* — Aristocratis Fotakis
(74) *Attorney, Agent, or Firm* — Holland & Hart LLP

(57) ABSTRACT

Methods, systems, and devices for wireless communications are described. A base station to communicate with a set of user equipments (UEs) in a spatial division multiplexing (SDM) configuration for dynamic spectrum sharing (DSS) communications. One or more first UEs of the set of UEs may communicate via a first radio access technology (RAT), and one or more second UEs may communicate via a second RAT in a multiple-user multiple-input multiple output (MU-MIMO) configuration. The base station may indicate the SDM configuration to one or more of the set of UEs. In some examples, the base station may transmit an indication to the set of UEs which may indicate a set of resources to be used for DSS communications. In some examples, the SDM configuration may specify one or more reference signal patterns for communicating in the set of resources.

27 Claims, 18 Drawing Sheets

DYNAMIC SPECTRUM SHARING WITH SPATIAL DIVISION MULTIPLEXING

FIELD OF TECHNOLOGY

The following relates to wireless communications, including dynamic spectrum sharing with spatial division multiplexing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may communicate with UEs via one or more radio access technologies (RATs), such as LTE and NR systems. In some examples, the base station may communicate via multiple RATs in a single radio frequency spectrum band.

SUMMARY

The described techniques relate to improved methods, systems, devices, and apparatuses that support dynamic spectrum sharing with spatial division multiplexing. Generally, the described techniques provide for enabling a base station to communicate with a set of user equipments (UEs) in a spatial division multiplexing (SDM) configuration for dynamic spectrum sharing (DSS) communications. One or more first UEs of the set of UEs may communicate via a first radio access technology (RAT), and one or more second UEs may communicate via a second RAT in a multiple-user multiple-input multiple output (MU-MIMO) configuration. The base station may indicate the SDM configuration to one or more of the set of UEs. In some examples, the base station may transmit an indication to the set of UEs which may indicate a set of resources to be used for DSS communications. In some examples, the SDM configuration may specify one or more reference signal patterns for communicating in the set of resources.

A method for wireless communications at a UE is described. The method may include receiving, from a base station, an indication of a set of resources to be used for dynamic spectrum sharing communications with the base station, determining, based on the received indication, a spatial division multiplexing configuration for the dynamic spectrum sharing communications with the base station, where the spatial division multiplexing configuration includes interference measurement resources for the set of resources, rate matching resources for the set of resources, or both, and communicating with the base station in accordance with the spatial division multiplexing configuration.

An apparatus for wireless communications at a UE is described. The apparatus may include a processor, memory coupled with the processor, and instructions stored in the memory. The instructions may be executable by the processor to cause the apparatus to receive, from a base station, an indication of a set of resources to be used for dynamic spectrum sharing communications with the base station, determine, based on the received indication, a spatial division multiplexing configuration for the dynamic spectrum sharing communications with the base station, where the spatial division multiplexing configuration includes interference measurement resources for the set of resources, rate matching resources for the set of resources, or both, and communicate with the base station in accordance with the spatial division multiplexing configuration.

Another apparatus for wireless communications at a UE is described. The apparatus may include means for receiving, from a base station, an indication of a set of resources to be used for dynamic spectrum sharing communications with the base station, means for determining, based on the received indication, a spatial division multiplexing configuration for the dynamic spectrum sharing communications with the base station, where the spatial division multiplexing configuration includes interference measurement resources for the set of resources, rate matching resources for the set of resources, or both, and means for communicating with the base station in accordance with the spatial division multiplexing configuration.

A non-transitory computer-readable medium storing code for wireless communications at a UE is described. The code may include instructions executable by a processor to receive, from a base station, an indication of a set of resources to be used for dynamic spectrum sharing communications with the base station, determine, based on the received indication, a spatial division multiplexing configuration for the dynamic spectrum sharing communications with the base station, where the spatial division multiplexing configuration includes interference measurement resources for the set of resources, rate matching resources for the set of resources, or both, and communicate with the base station in accordance with the spatial division multiplexing configuration.

Some examples of the method, apparatuses, and non-transitory computer-readable medium described herein may further include operations, features, means, or instructions for receiving, via explicit signaling, a notification that a transmission to the UE applies the spatial division multiplexing configuration.

In some examples of the method, apparatuses, and non-transitory computer-readable medium described herein, the notification indicates that a first communication with the UE via a first radio access technology may be multiplexed with a second communication with a second UE via a second radio access technology in accordance with the spatial division multiplexing configuration.

In some examples of the method, apparatuses, and non-transitory computer-readable medium described herein, the notification includes a location, a scrambling sequence, a transmission power, or any combination thereof, for one or more reference signals configured for transmission in the set of resources.

Some examples of the method, apparatuses, and non-transitory computer-readable medium described herein may further include operations, features, means, or instructions for receiving, via implicit signaling, a notification that a transmission to the UE applies the spatial division multiplexing configuration.

In some examples of the method, apparatuses, and non-transitory computer-readable medium described herein, the notification may be the spatial division multiplexing configuration.

Some examples of the method, apparatuses, and non-transitory computer-readable medium described herein may further include operations, features, means, or instructions for determining one or more reference signal patterns associated with the set of resources, where the one or more reference signal patterns include the interference measurement resources, the rate matching resources, or both.

In some examples of the method, apparatuses, and non-transitory computer-readable medium described herein, the one or more reference signal patterns further include a set of antenna ports associated with one or more demodulation reference signals shared between communications via a first radio access technology and communications via a second radio access technology.

In some examples of the method, apparatuses, and non-transitory computer-readable medium described herein, the received indication includes a configuration associated with the one or more reference signal patterns.

In some examples of the method, apparatuses, and non-transitory computer-readable medium described herein, the interference measurement resources may be associated with communications via a first radio access technology and communications via a second radio access technology.

In some examples of the method, apparatuses, and non-transitory computer-readable medium described herein, the interference measurement resources include a New Radio (NR) interference measurement resource, or a resource for measuring interference from a Long Term Evolution (LTE) cell-specific reference signal, an LTE non-zero power channel state information reference signal, an LTE sounding reference signal, or any combination thereof.

In some examples of the method, apparatuses, and non-transitory computer-readable medium described herein, the rate matching resources may be associated with an LTE demodulation reference signal, an LTE cell-specific reference signal, a zero power channel state information reference signal (CSI-RS) associated with LTE channel state information (CSI) resources, or any combination thereof.

Some examples of the method, apparatuses, and non-transitory computer-readable medium described herein may further include operations, features, means, or instructions for identifying, in the received indication, a configuration associated with a rate matching pattern for one or more reference signals configured for transmission in the set of resources, where the rate matching pattern may be based on a first numerology associated with a first radio access technology and a second numerology associated with a second radio access technology, and where communicating with the base station may be further in accordance with the rate matching pattern.

In some examples of the method, apparatuses, and non-transitory computer-readable medium described herein, the spatial division multiplexing configuration includes a first layer associated with communications via the first radio access technology and a second layer associated with communications via the second radio access technology.

In some examples of the method, apparatuses, and non-transitory computer-readable medium described herein, the indication may be received in a medium access control (MAC) control element (CE), a downlink control information message, a radio resource control configuration message, or any combination thereof.

A method for wireless communications at a base station is described. The method may include determining a spatial division multiplexing configuration for dynamic spectrum sharing communications with one or more first UEs communicating via a first radio access technology and with one or more second UEs communicating via a second radio access technology, transmitting, to at least the one or more first UEs, an indication of a set of resources to be used for the dynamic spectrum sharing communications, where the spatial division multiplexing configuration includes interference measurement resources for the set of resources, rate matching resources for the set of resources, or both, and communicating in accordance with the spatial division multiplexing configuration.

An apparatus for wireless communications at a base station is described. The apparatus may include a processor, memory coupled with the processor, and instructions stored in the memory. The instructions may be executable by the processor to cause the apparatus to determine a spatial division multiplexing configuration for dynamic spectrum sharing communications with one or more first UEs communicating via a first radio access technology and with one or more second UEs communicating via a second radio access technology, transmit, to at least the one or more first UEs, an indication of a set of resources to be used for the dynamic spectrum sharing communications, where the spatial division multiplexing configuration includes interference measurement resources for the set of resources, rate matching resources for the set of resources, or both, and communicate in accordance with the spatial division multiplexing configuration.

Another apparatus for wireless communications at a base station is described. The apparatus may include means for determining a spatial division multiplexing configuration for dynamic spectrum sharing communications with one or more first UEs communicating via a first radio access technology and with one or more second UEs communicating via a second radio access technology, means for transmitting, to at least the one or more first UEs, an indication of a set of resources to be used for the dynamic spectrum sharing communications, where the spatial division multiplexing configuration includes interference measurement resources for the set of resources, rate matching resources for the set of resources, or both, and means for communicating in accordance with the spatial division multiplexing configuration.

A non-transitory computer-readable medium storing code for wireless communications at a base station is described. The code may include instructions executable by a processor to determine a spatial division multiplexing configuration for dynamic spectrum sharing communications with one or more first UEs communicating via a first radio access technology and with one or more second UEs communicating via a second radio access technology, transmit, to at least the one or more first UEs, an indication of a set of resources to be used for the dynamic spectrum sharing communications, where the spatial division multiplexing configuration includes interference measurement resources for the set of resources, rate matching resources for the set of resources, or both, and communicate in accordance with the spatial division multiplexing configuration.

Some examples of the method, apparatuses, and non-transitory computer-readable medium described herein may further include operations, features, means, or instructions for transmitting, via explicit signaling, a notification that a transmission to at least the one or more first UEs applies the spatial division multiplexing configuration.

In some examples of the method, apparatuses, and non-transitory computer-readable medium described herein, the notification indicates that a first communication with the one or more first UEs via the first radio access technology may be multiplexed with a second communication with the one or more second UEs via the second radio access technology in accordance with the spatial division multiplexing configuration.

In some examples of the method, apparatuses, and non-transitory computer-readable medium described herein, the notification includes a location, a scrambling sequence, a transmission power, or any combination thereof, for one or more reference signals configured for transmission in the set of resources.

Some examples of the method, apparatuses, and non-transitory computer-readable medium described herein may further include operations, features, means, or instructions for transmitting, via implicit signaling, a notification that a transmission to at least the one or more first UEs applies the spatial division multiplexing configuration.

In some examples of the method, apparatuses, and non-transitory computer-readable medium described herein, the notification may be the spatial division multiplexing configuration.

Some examples of the method, apparatuses, and non-transitory computer-readable medium described herein may further include operations, features, means, or instructions for determining one or more reference signal patterns associated with the set of resources, where the one or more reference signal patterns include the interference measurement resources, the rate matching resources, or both.

In some examples of the method, apparatuses, and non-transitory computer-readable medium described herein, the one or more reference signal patterns further include a set of antenna ports associated with one or more demodulation reference signals shared between communications via the first radio access technology and communications via the second radio access technology.

In some examples of the method, apparatuses, and non-transitory computer-readable medium described herein, the transmitted indication includes a configuration associated with the one or more reference signal patterns.

In some examples of the method, apparatuses, and non-transitory computer-readable medium described herein, the interference measurement resources may be associated with communications via the first radio access technology and communications via the second radio access technology.

In some examples of the method, apparatuses, and non-transitory computer-readable medium described herein, the interference measurement resources include an NR interference measurement resource, or a resource for measuring interference from an LTE cell-specific reference signal, an LTE non-zero power channel state information reference signal, an LTE sounding reference signal, or any combination thereof.

In some examples of the method, apparatuses, and non-transitory computer-readable medium described herein, the rate matching resources may be associated with an LTE demodulation reference signal, an LTE cell-specific reference signal, a zero power CSI-RS associated with LTE CSI-RS resources, or any combination thereof.

Some examples of the method, apparatuses, and non-transitory computer-readable medium described herein may further include operations, features, means, or instructions for determining a first numerology associated with the first radio access technology and a second numerology associated with the second radio access technology and determining a rate matching pattern for one or more reference signals configured for transmission in the set of resources based on the first numerology and the second numerology, where the transmitted indication includes a configuration associated with the rate matching pattern.

In some examples of the method, apparatuses, and non-transitory computer-readable medium described herein, the rate matching pattern includes an NR demodulation reference signal rate matching pattern associated with interference between communications via the first radio access technology and communications via the second radio access technology.

Some examples of the method, apparatuses, and non-transitory computer-readable medium described herein may further include operations, features, means, or instructions for puncturing one or more resource elements of the set of resources based on interference between communications via the first radio access technology and communications via the second radio access technology.

In some examples of the method, apparatuses, and non-transitory computer-readable medium described herein, the one or more resource elements may be allocated for communications via an LTE radio access technology and the first radio access technology or the second radio access technology includes the LTE radio access technology.

Some examples of the method, apparatuses, and non-transitory computer-readable medium described herein may further include operations, features, means, or instructions for transmitting, to the one or more second UEs, the indication of the set of resources to be used for the dynamic spectrum sharing communications.

In some examples of the method, apparatuses, and non-transitory computer-readable medium described herein, at least one UE of the one or more first UEs may be included in the one or more second UEs.

In some examples of the method, apparatuses, and non-transitory computer-readable medium described herein, the spatial division multiplexing configuration includes a first layer associated with communications via the first radio access technology and a second layer associated with communications via the second radio access technology.

In some examples of the method, apparatuses, and non-transitory computer-readable medium described herein, the spatial division multiplexing configuration may be an orthogonal configuration or a non-orthogonal configuration associated with communications via the first radio access technology and communications via the second radio access technology.

In some examples of the method, apparatuses, and non-transitory computer-readable medium described herein, the indication may be transmitted in a MAC CE, a downlink control information message, a radio resource control configuration message, or any combination thereof.

DETAILED DESCRIPTION

Figure 1:
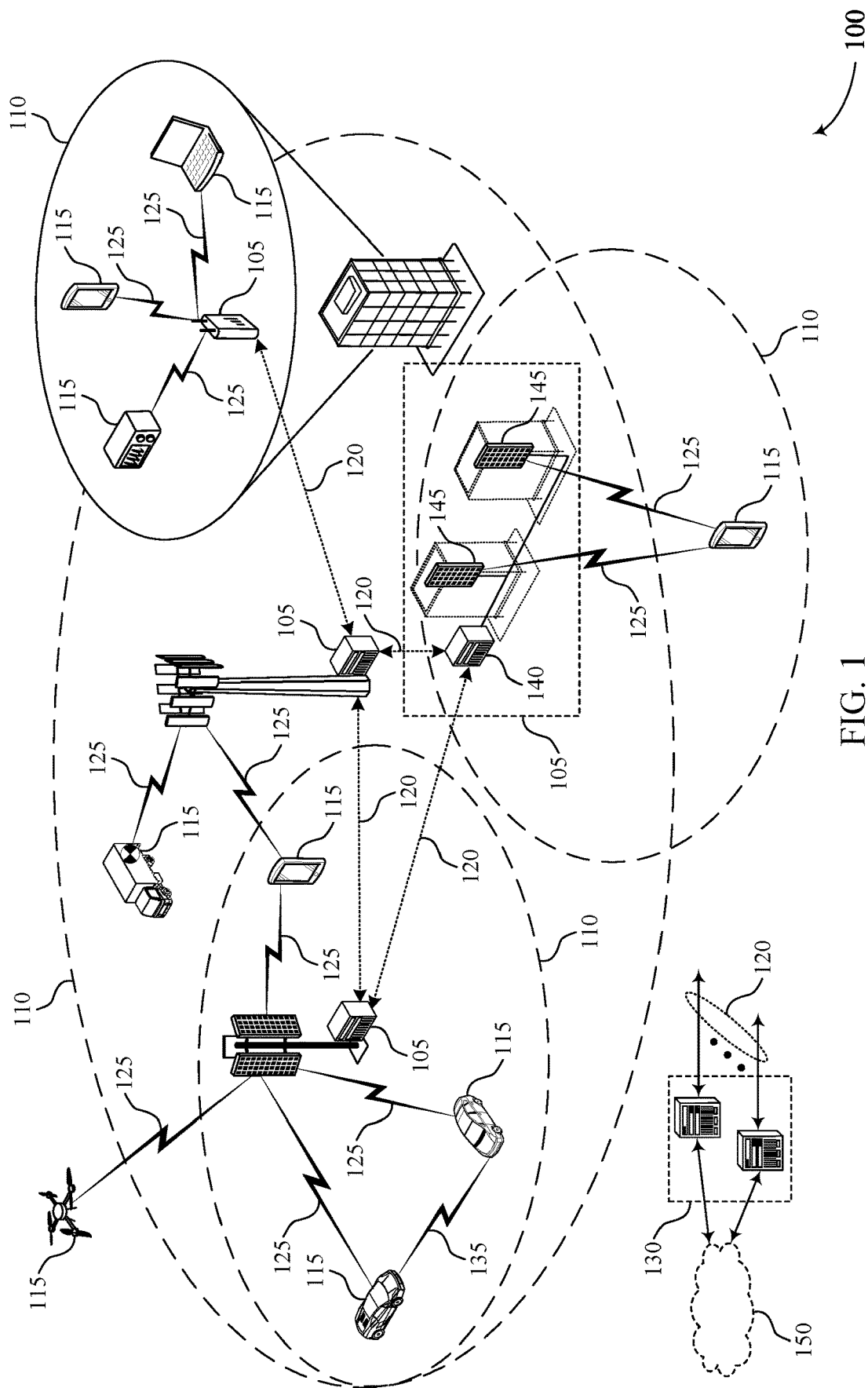
FIG. 1 illustrates an example of a wireless communications system that supports dynamic spectrum sharing with spatial division multiplexing in accordance with aspects of the present disclosure.

A user equipment (UE) in a wireless communications system may communicate with one or more network nodes such as base stations. The wireless communications system may operate using one or more radio frequency spectrum bands, which may include licensed or unlicensed radio frequency spectrum bands, or both. Base stations may communicate with UEs via one or more radio access technologies (RATs), such as Long Term Evolution (LTE) and New Radio (NR) systems.

In some examples, a base station may communicate via multiple RATs in a single radio frequency spectrum band, which may be referred to as dynamic spectrum sharing (DSS). For example, a radio frequency spectrum band dedicated for use by a first RAT (e.g., LTE) may be dynamically shared with a second RAT (e.g., NR), which may enable efficient use of the radio frequency spectrum band. In some examples, DSS may be based on time division multiplexing (TDM) and/or frequency division multiplexing (FDM) techniques. However, spectral efficiency may increase by employing spatial division multiplexing (SDM) techniques in DSS communications.

According to the techniques described herein, a base station may communicate with a set of UEs in an SDM configuration for DSS communications, which may also be referred to as an inter-RAT multiple-input multiple-output (MIMO) configuration. One or more first UEs of the set of UEs may communicate via a first RAT (e.g., NR), and one or more second UEs may communicate via a second RAT (e.g., LTE) in a multiple-user MIMO (MU-MIMO) configuration. In some examples, the SDM configuration may include a set of MIMO layers (e.g., eight layers). A first layer may be configured for communications via the first RAT, and a second layer may be configured for communications via the second RAT. In some examples, a UE may include a set of RAT entities, where a first RAT entity may communicate via the first RAT and a second RAT entity may communicate via the second RAT in a single-user MIMO (SU-MIMO) configuration.

The base station may indicate the SDM configuration to one or more of the set of UEs. In some examples, the base station may transmit an indication to the set of UEs which may indicate a set of resources to be used for DSS communications. In some examples, the SDM configuration may specify one or more reference signal patterns for communicating in the set of resources. For example, the SDM configuration may include an inter-RAT rate matching pattern for reference signals such as a demodulation reference signal (DRMS), a cell-specific reference signal (CRS), a channel state information reference signal (CSI-RS), etc. In some examples, the SDM configuration may specify one or more reference signal patterns as interference measurement resources. For example, the base station may configure one or more reference signals (e.g., a CRS, a CSI-RS, a sounding reference signal (SRS), etc.) to measure inter-RAT interference in DSS communications. Additionally or alternatively, the SDM configuration may specify a set of antenna ports to enable port sharing of the same reference signal resource between the first RAT and the second RAT for communicating reference signals (e.g., DMRS).

In some examples, the base station may notify the UEs of the SDM configuration for DSS communications via explicit or implicit signaling. For example, the implicit signaling may configure UEs with resources for DSS communications according to the SDM configuration. The implicit signaling may indicate the rate matching pattern, the interference measurement resources, the antenna port sharing configuration, etc. Based on the implicit signaling, one or more UEs (e.g., UEs communicating in NR systems) may determine the SDM configuration and communicate accordingly. In some examples, the explicit signaling may indicate to a first one or more UEs that a first communication with the first one or more UEs via the first RAT is multiplexed with a second communication with a second one or more UEs via the second RAT according to the SDM configuration. In some examples, the explicit signaling may indicate information (e.g., a location, a scrambling sequence, a transmission power, etc.) associated with the second communication.

Aspects of the disclosure are initially described in the context of wireless communications systems. An example multiplexing scheme and an example process flow are then described. Aspects of the disclosure are further illustrated by and described with reference to apparatus diagrams, system diagrams, and flowcharts that relate to dynamic spectrum sharing with spatial division multiplexing.

FIG. 1 illustrates an example of a wireless communications system 100 that supports dynamic spectrum sharing with spatial division multiplexing in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include SU-MIMO, where multiple spatial layers are transmitted to the same receiving device, and MU-MIMO, where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may communicate with a set of UEs 115 in an SDM configuration for DSS communications, which may also be referred to as an inter-RAT MIMO configuration. One or more first UEs 115 of the set of UEs 115 may communicate via a first RAT (e.g., NR), and one or more second UEs 115 may communicate via a second RAT (e.g., LTE) in a MU-MIMO configuration. In some examples, the SDM configuration may include a set of MIMO layers (e.g., eight layers). A first layer may be configured for communications via the first RAT, and a second layer may be configured for communications via the second RAT. In some examples, a UE 115 may include a set of RAT entities, where a first RAT entity may communicate via the first RAT and a second RAT entity may communicate via the second RAT in a SU-MIMO configuration.

Figure 2:
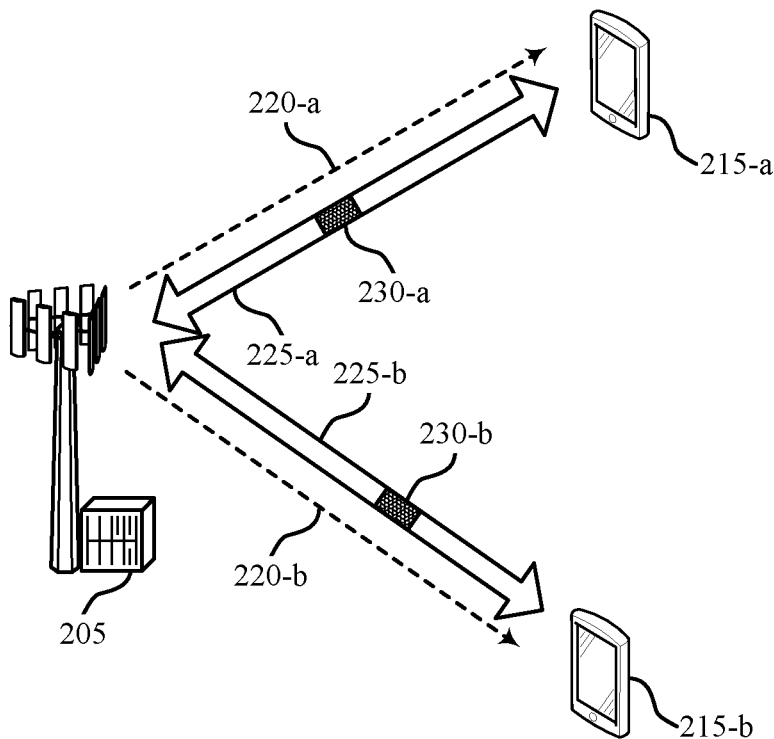
FIG. 2 illustrates an example of a wireless communications system that supports dynamic spectrum sharing with spatial division multiplexing in accordance with aspects of the present disclosure.
Figure 2:
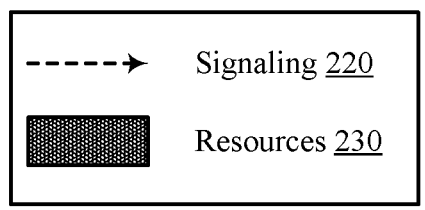

FIG. 2 illustrates an example of a wireless communications system 200 that supports dynamic spectrum sharing with spatial division multiplexing in accordance with aspects of the present disclosure. In some examples, the wireless communications system 200 may implement aspects of wireless communications system 100. For example, the wireless communications system 200 may include a base station 205 and UEs 215, which may be examples of the corresponding devices described with reference to FIG. 1. The wireless communications system 200 may include features for improved resource configuration and transmission, among other benefits.

The base station 205 may communicate with the UEs 215 via channels 225 using DSS techniques. For example, the UE 215-a may communicate via a first RAT (e.g., NR), and the UE 215-b may communicate via a second RAT (e.g., LTE). In some examples, a UE 215 (e.g., the UE 215-a) may include a set of RAT entities, where a first RAT entity may enable the UE 215 to communicate via the first RAT and a second RAT entity may enable the UE 215 to communicate via the second RAT in a SU-MIMO configuration.

In some examples, a scheduling configuration and a scalable numerology of one or more RATs (e.g., NR) may enable DSS communications between the base station 205 and the UEs 215. For example, within a slot, a starting point or a length of a scheduled data transmission (e.g., a physical downlink shared channel (PDSCH) transmission or a physical uplink shared channel (PUSCH) transmission) may be adjusted to improve an efficiency or a reliability of DSS communications via a set of RATs. In some examples, within the slot or a TTI, an allocation in the time domain for a transmission via the first RAT may be adjusted to avoid signals (e.g., reference signals, such as a CRS) of the second RAT.

In some examples, a base station 205 may configure and dynamically indicate a rate matching pattern (e.g., an inter-RAT rate matching pattern) to the UEs 215, for example in signaling 220, to enable DSS communications via the channels 225. The rate matching pattern may be configured at a symbol level, an RB level or a resource element (RE) level, among other examples. The rate matching pattern may be applied to respective reference signals (e.g., CRS) of each RAT. For example, the rate matching pattern may enable transmission of an LTE CRS and NR data in a same symbol using FDM techniques.

In some examples, a subframe in the second RAT (e.g., LTE) may reserved for a multicast-broadcast single frequency network (MBSFN) service. A UE 215 (e.g., the UE 215-b) communicating via the second RAT may not communicate during a subframe reserved for MBSFN, and another UE 215 (e.g., the UE 215-a) may communicate via the first RAT (e.g., NR) without multiplexing or rate matching techniques in the MBSFN subframe.

The base station 205 may determine an SDM configuration to improve DSS communications with the UEs 215. In some examples, the SDM configuration may include MIMO techniques, such as a set of spatial layers for communicating via the channels 225. For example, a first spatial layer may be configured for communications via the first RAT, and a second spatial layer may be configured for communications via the second RAT.

The base station 205 may indicate the SDM configuration to one or more of the UEs 215. In some examples, the base station 205 may transmit the signaling 220 to the UEs 215 which may indicate a set of resources 230 to be used for DSS communications. In some examples, the resources 230 may include the set of spatial layers for communicating via the first RAT and the second RAT. In some examples, the base station 205 may transmit the signaling 220 in a MAC control element (MAC-CE), a downlink control information (DCI) message, an RRC configuration message, or any combination thereof.

In some examples, the SDM configuration may specify one or more reference signal patterns for communicating in the set of resources 230. The SDM configuration may include a rate matching pattern (e.g., an inter-RAT rate matching pattern) for reference signals such as a DRMS, a CRS, or a CSI-RS, among other examples. For example, the SDM configuration may specify one or more rate matching patterns for DMRSs in LTE, where the patterns may be defined at the RE level. Additionally or alternatively, the SDM configuration may define a zero power CSI-RS pattern for CSI-RS resources in LTE. In some examples, the base station 205 may configure and dynamically indicate multiple rate matching patterns to an NR UE 215 (e.g., the UE 215-a) based on an LTE DMRS pattern. For example, the base station may determine the rate matching pattern for the NR UE 215 based on one or more parameters of the LTE DMRS pattern, such as a transmission mode, a quantity of layers, etc.

In some examples, the first RAT may be associated with a first numerology (e.g., 15 kilohertz (kHz), 30 kHz, or 120 kHz) and the second RAT may be associated with a second numerology (e.g., 15 kHz). The rate matching pattern may be based on the first numerology and the second numerology. In some examples, a rate matching pattern may be defined for each numerology of the first RAT, or a scaling rule may be defined.

In some examples, the SDM configuration may specify one or more reference signal patterns as interference measurement resources. For example, the base station 205 may configure one or more reference signals to measure inter-RAT interference and thus improve link adaptation in DSS communications. In some examples, the interference measurement resources may include an LTE CRS pattern, a non-zero power CSI-RS pattern for CSI-RS resources in LTE, an SRS pattern, one or more additional reference signal patterns, or any combination thereof. Additionally or alternatively, the base station 205 may include the interference measurement resources in NR channel state information (CSI) resource and report settings (e.g., based on an RRC configuration). The base station 205 may configure the CSI resource and report settings for interference measurement resources periodically or aperiodically.

In some examples, the SDM configuration may specify a set of antenna ports to enable port sharing of the same reference signal resource between the first RAT and the second RAT for communicating reference signals (e.g., DMRS). For example, a set of antenna ports for LTE DMRS (e.g., ports 7 through 14) may be shared between LTE and NR based on an orthogonal port sharing configuration. Based on the orthogonal port sharing configuration, the UEs 215 and the base station 205 may avoid inter-RAT interference in channel estimation (e.g., when estimating the channels 225).

In some examples, the base station 205 may notify the UEs 215 of the SDM configuration for DSS communications via explicit or implicit signaling in the signaling 220. For example, the implicit signaling may configure the UEs 215 with resources for DSS communications according to the SDM configuration. The implicit signaling may indicate the rate matching pattern, the interference measurement resources, the antenna port sharing configuration, etc. Based on the implicit signaling, one or more UEs 215 (e.g., the UE 215-a, which may be a UE 215 communicating via NR) may determine the SDM configuration and communicate accordingly. In some examples, the explicit signaling may indicate to the UE 215-a that a first communication with the UE 215-a via the first RAT is multiplexed with a second communication with the UE 215-b via the second RAT according to the SDM configuration. In some examples, the explicit signaling may indicate information (e.g., a location, a scrambling sequence, a transmission power, etc.) associated with the second communication. Based on the signaling 220, the UEs 215 may determine the SDM configuration and communicate accordingly, which may improve an efficiency and a reliability of communication operations between the base station 205 and the UEs 215, among other benefits.

Figure 3:
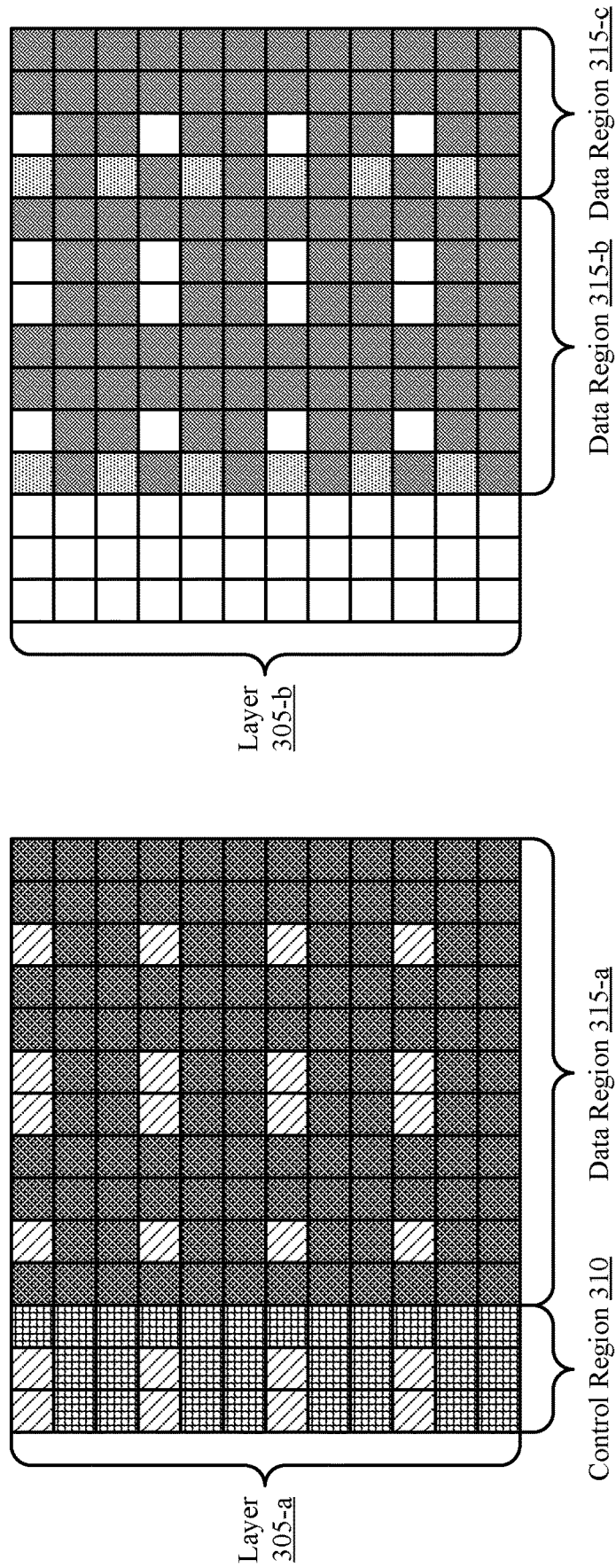
FIG. 3 illustrates an example of a multiplexing scheme that supports dynamic spectrum sharing with spatial division multiplexing in accordance with aspects of the present disclosure.

FIG. 3 illustrates an example of a multiplexing scheme 300 that supports dynamic spectrum sharing with spatial division multiplexing in accordance with aspects of the present disclosure. In some examples, the multiplexing scheme 300 may implement aspects of wireless communications systems 100 and 200. For example, the multiplexing scheme 300 may be associated with communications between a UE and a base station, which may be examples of corresponding devices described with reference to FIGS. 1 and 2. The multiplexing scheme 300 may illustrate features for improved resource configuration and transmission, among other benefits.

A base station may determine an SDM configuration to improve DSS communications with a set of UEs according to the multiplexing scheme 300. In some examples, the SDM configuration may include MIMO techniques, such as a set of spatial layers 305 to enable a base station to communicate with a set of UEs via a set of RATs in the SDM configuration. Each layer 305 may include a number of RBs configured to transmit one or more of data, reference signals, control information, etc. As illustrated in FIG. 3, each column of a layer 305 may correspond to a symbol of a subframe or slot in the time domain, and each row may correspond to a frequency subband with a sub-carrier spacing based on a numerology (e.g., 15 kHz) of the RAT.

As illustrated in FIG. 3, a layer 305-a may be configured for communications via LTE and a layer 305-b may be configured for communications via NR. The layer 305-a may include a control region 310 and a data region 315-a. The control region 310 may be configured for transmission of LTE control information (e.g., a physical downlink control channel (PDCCH) transmission), as well as one or more reference signals, such as an LTE CRS. The data region 315-a may be configured for transmission of LTE data (e.g., in a PDSCH transmission) and reference signals. In some examples, the LTE CRS may be assigned to RBs in the layer 305-a based on a reference signal pattern specified in the SDM configuration for DSS communications. In some examples, one or more RBs of the layer 305-a may include additional reference signals (e.g., DMRS, CSI-RS, etc.) according to one or more reference signal patterns in the SDM configuration. In some examples, the SDM configuration may specify a rate matching pattern (e.g., an inter-RAT rate matching pattern) for NR DMRS in the layer 305-a (not shown), which may avoid interference between the layers 305. Additionally or alternatively, a base station may determine to puncture one or more REs of the LTE allocation to reduce interference for an NR UE communicating via the layer 305-b.

The layer 305-b may include data regions 315-b and 315-c configured for transmission of NR data, as wells as one or more reference signals, such as an NR DMRS. The data regions 315-b and 315-c may correspond to the data region 315-a in the time domain according to the SDM configuration. In some examples, the SDM configuration may specify a reference signal pattern for the NR DMRS. The SDM configuration may also specify reference signal patterns for additional reference signals, such as a CRS, a CSI-RS, etc. Based on the multiplexing scheme 300, the UEs and the base station may improve an efficiency and a reliability of communication operations, among other benefits.

Figure 4:
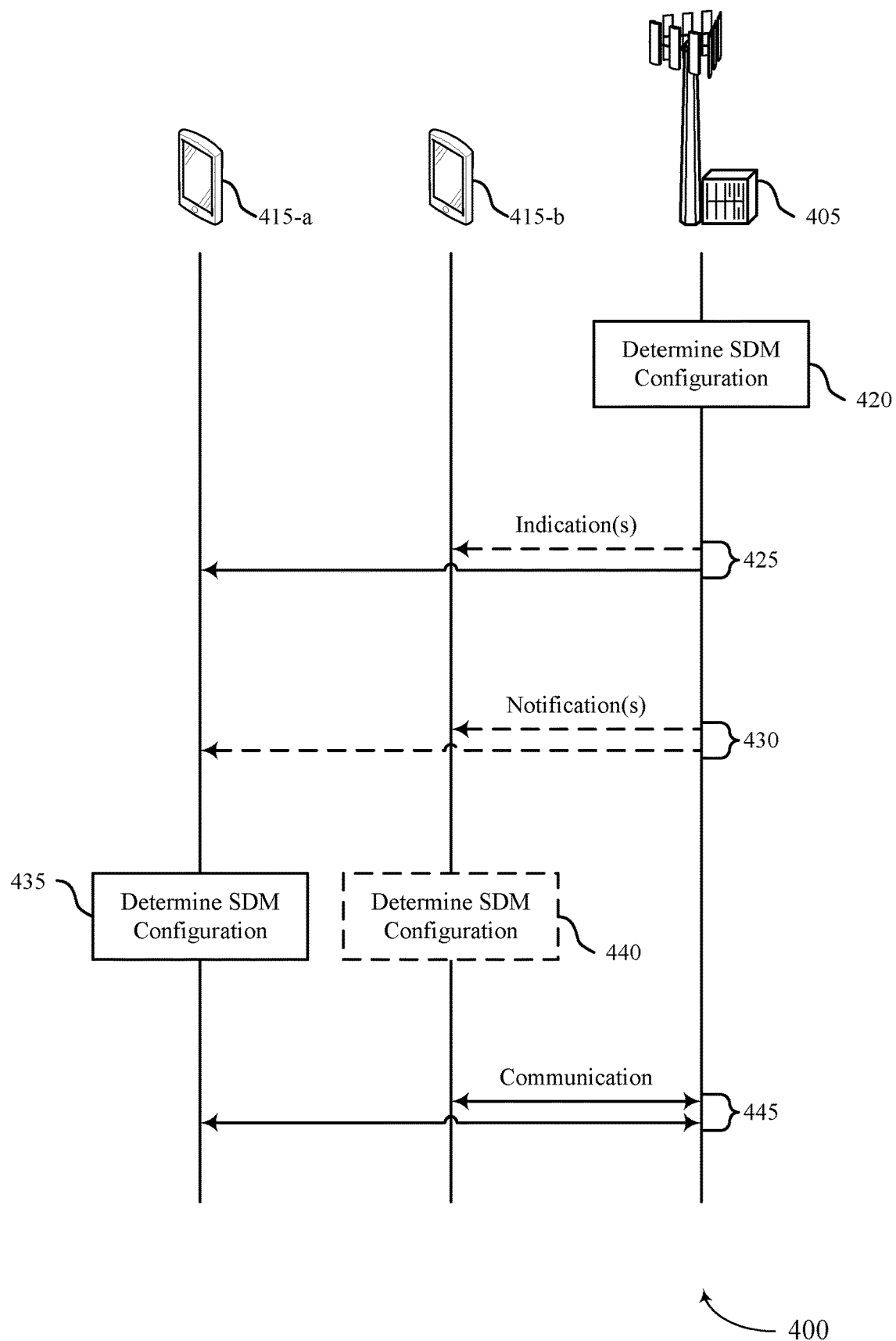
FIG. 4 illustrates an example of a process flow that supports dynamic spectrum sharing with spatial division multiplexing in accordance with aspects of the present disclosure.

FIG. 4 illustrates an example of a process flow 400 that supports dynamic spectrum sharing with spatial division multiplexing in accordance with aspects of the present disclosure. In some examples, the process flow 400 may implement aspects of wireless communications systems 100 and 200. For example, the process flow 400 may include example operations associated with one or more of a base station 405 or a UE 415, which may be examples of the corresponding devices described with reference to FIGS. 1 and 2. In the following description of the process flow 400, the operations between the base station 405 and the UEs 415 may be performed in a different order than the example order shown, or the operations performed by the base station 405 and the UEs 415 may be performed in different orders or at different times. Some operations may also be omitted from the process flow 400, and other operations may be added to the process flow 400. The operations performed by the base station 405 and the UEs 415 may support improvement to the base station 405 resource configuration operations and, in some examples, may promote improvements to spectral efficiency for communications between the base station 405 and the UEs 415, among other benefits.

At 420, the base station 405 may determine an SDM configuration to improve DSS communications with the UEs 415. In some examples, the SDM configuration may include MIMO techniques, such as a set of spatial layers. For example, a first spatial layer may be configured for communications via the first RAT, and a second spatial layer may be configured for communications via the second RAT. In some examples, the base station 405 may communicate with a UE 415-*a* via the first RAT (e.g., NR) and with a UE 415-*b* via the second RAT (e.g., LTE).

At 425, the base station 405 may transmit an indication of a set of resources to be used for DSS communications. The indication may be transmitted to the UE 415-*a* and in some examples to the UE 415-*b*. In some examples, the set of resources may include the set of spatial layers for communicating via the first RAT and the second RAT. In some examples, the base station 405 may transmit the indication in a MAC-CE, a DCI message, an RRC configuration message, or any combination thereof.

In some examples, at 430 the base station 405 may transmit a notification to one or more of the UEs 415. The notification may indicate that a transmission to the UEs 415 is configured to apply the SDM configuration. In some examples, the base station 405 may notify the UEs 415 of the SDM configuration via explicit or implicit signaling in the notification. For example, the implicit signaling may configure the UEs 415 with resources for DSS communications according to the SDM configuration, such as resources for a rate matching pattern, interference measurement resources, an antenna port sharing configuration, etc. In some examples, the explicit signaling may indicate to the UE 415-*a* that a first communication with the UE 415-*a* via the first RAT is multiplexed with a second communication with the UE 415-*b* via the second RAT according to the SDM configuration. In some examples, the explicit signaling may indicate information (e.g., a location, a scrambling sequence, a transmission power, etc.) associated with the second communication.

At 435, the UE 415-*a* may determine the SDM configuration for the set of resources. In some examples, the UE 415-*a* may determine the SDM configuration based on the indication and/or the notification. In some examples, at 440 the UE 415-*b* may also determine the SDM configuration for the set of resources. In some examples, the SDM configuration may specify one or more reference signal patterns for communicating in the set of resources. For example, the SDM configuration may include a rate matching pattern (e.g., an inter-RAT rate matching pattern) for reference signals such as a DRMS, a CRS, a CSI-RS, etc. In some examples, the SDM configuration may specify one or more reference signal patterns as interference measurement resources. In some examples, the SDM configuration may specify a set of antenna ports to enable port sharing between the first RAT and the second RAT for communicating reference signals (e.g., DMRS).

At 445, the base station 405 may communicate with the UEs 415 in the set of resources according to the SDM configuration. The operations performed by the base station 405 and the UEs 415 may support improvement to the base station 405 resource configuration operations and, in some examples, may promote improvements to spectral efficiency for communications between the base station 405 and the UEs 415, among other benefits.

Figure 5:
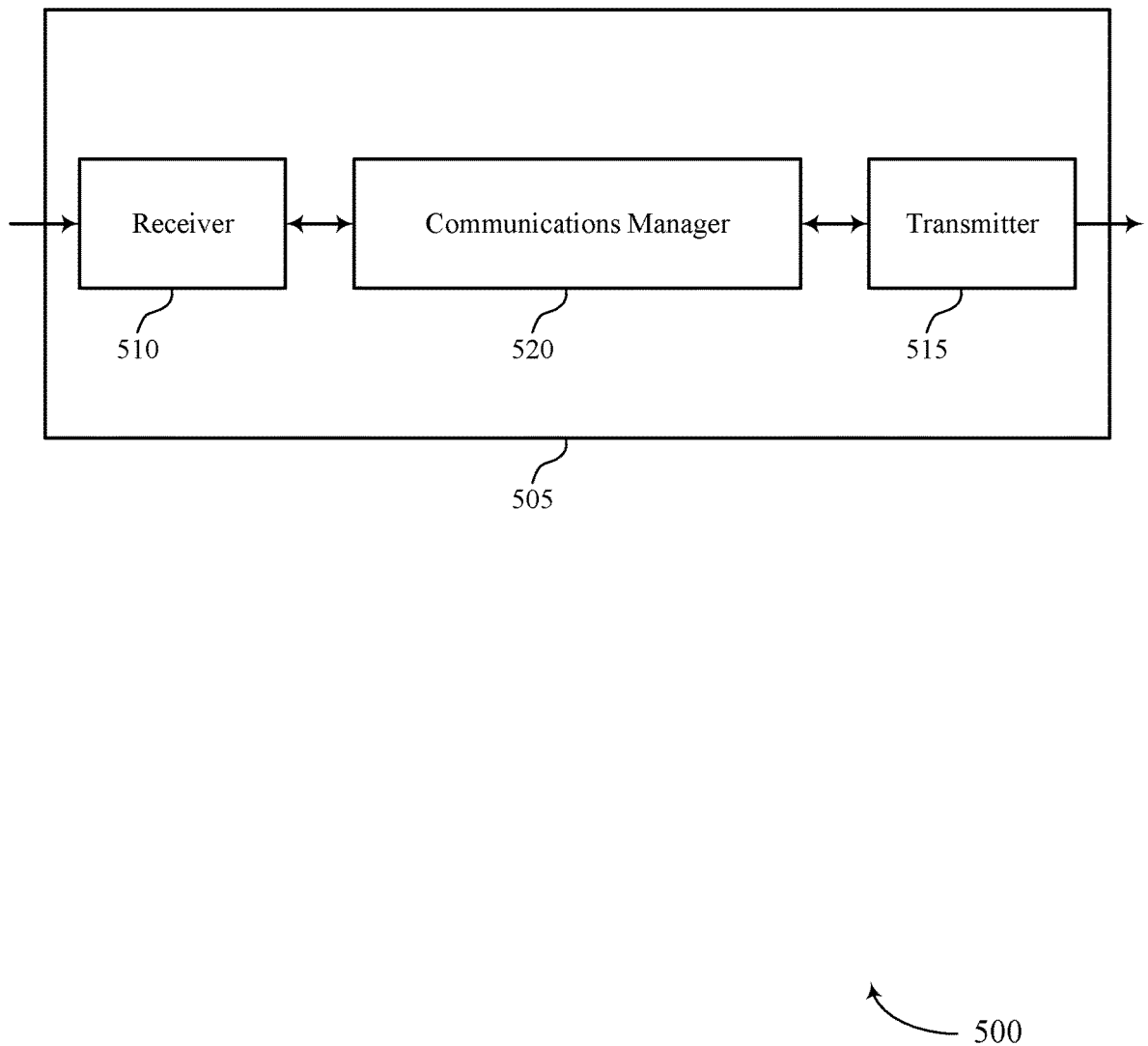
FIGS. 5 and 6 show block diagrams of devices that support dynamic spectrum sharing with spatial division multiplexing in accordance with aspects of the present disclosure.

FIG. 5 shows a block diagram 500 of a device 505 that supports dynamic spectrum sharing with spatial division multiplexing in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic spectrum sharing with spatial division multiplexing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic spectrum sharing with spatial division multiplexing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic spectrum sharing with spatial division multiplexing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, an indication of a set of resources to be used for dynamic spectrum sharing communications with the base station. The communications manager 520 may be configured as or otherwise support a means for determining, based on the received indication, a spatial division multiplexing configuration for the dynamic spectrum sharing communications with the base station, where the spatial division multiplexing configuration includes interference measurement resources for the set of resources, rate matching resources for the set of resources, or both. The communications manager 520 may be configured as or otherwise support a means for communicating with the base station in accordance with the spatial division multiplexing configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing power consumption and increasing communications efficiency based on determining the SDM configuration for the set of resources. In some examples, a processor of the device 505 may reconfigure parameters for communicating in the resources. For example, the processor of the device 505 may turn on one or more processing units for mapping signals to the resources, increase a processing clock, or a similar mechanism within the device 505. As such, when subsequent SDM configurations are received, the processor may be ready to respond more efficiently through the reduction of a ramp up in processing power. The improvements in power saving and communications efficiency may further increase battery life at the device 505.

Figure 6:
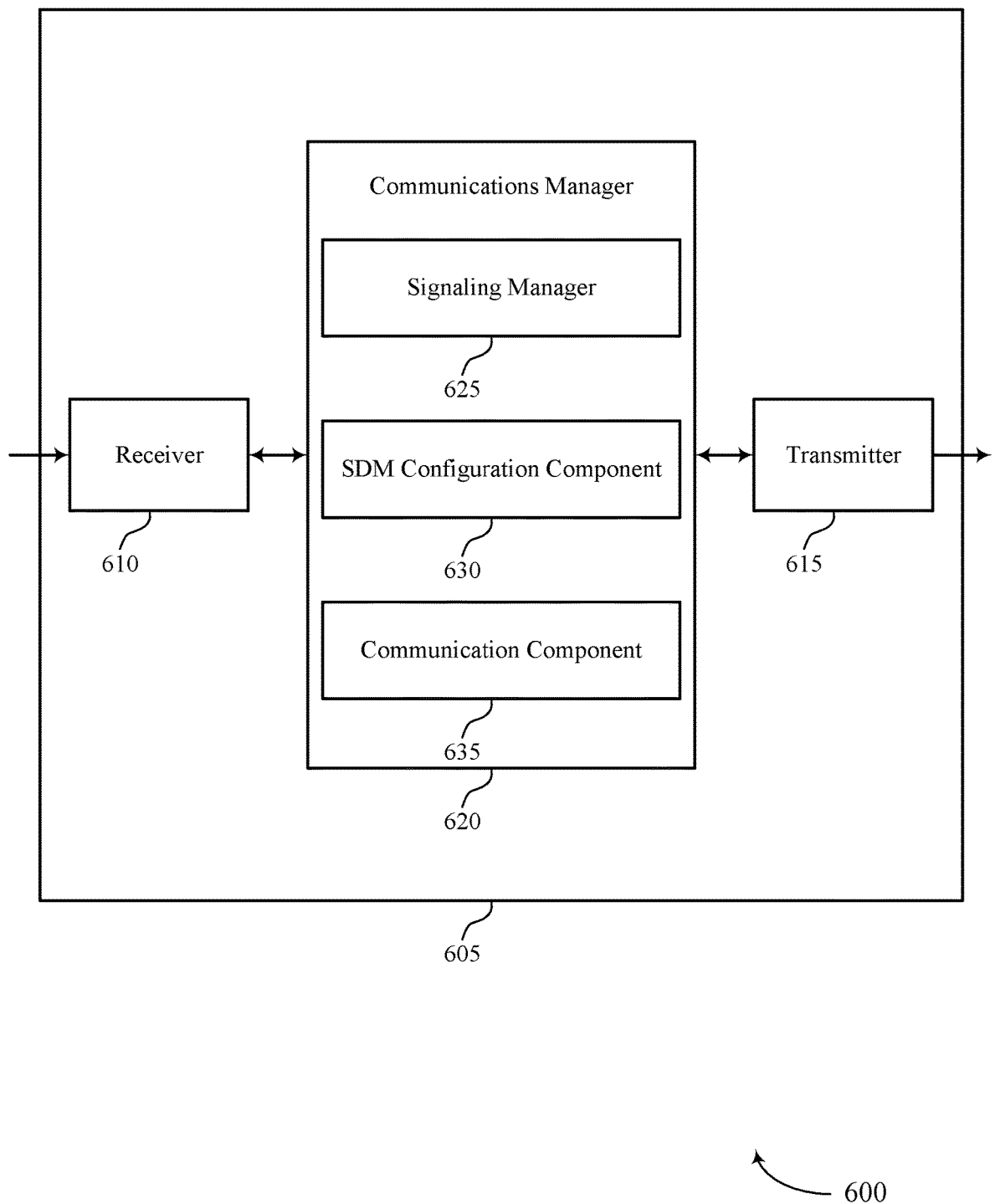

FIG. 6 shows a block diagram 600 of a device 605 that supports dynamic spectrum sharing with spatial division multiplexing in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic spectrum sharing with spatial division multiplexing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic spectrum sharing with spatial division multiplexing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic spectrum sharing with spatial division multiplexing as described herein. For example, the communications manager 620 may include a signaling manager 625, an SDM configuration component 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The signaling manager 625 may be configured as or otherwise support a means for receiving, from a base station, an indication of a set of resources to be used for dynamic spectrum sharing communications with the base station. The SDM configuration component 630 may be configured as or otherwise support a means for determining, based on the received indication, a spatial division multiplexing configuration for the dynamic spectrum sharing communications with the base station, where the spatial division multiplexing configuration includes interference measurement resources for the set of resources, rate matching resources for the set of resources, or both. The communication component 635 may be configured as or otherwise support a means for communicating with the base station in accordance with the spatial division multiplexing configuration.

Figure 7:
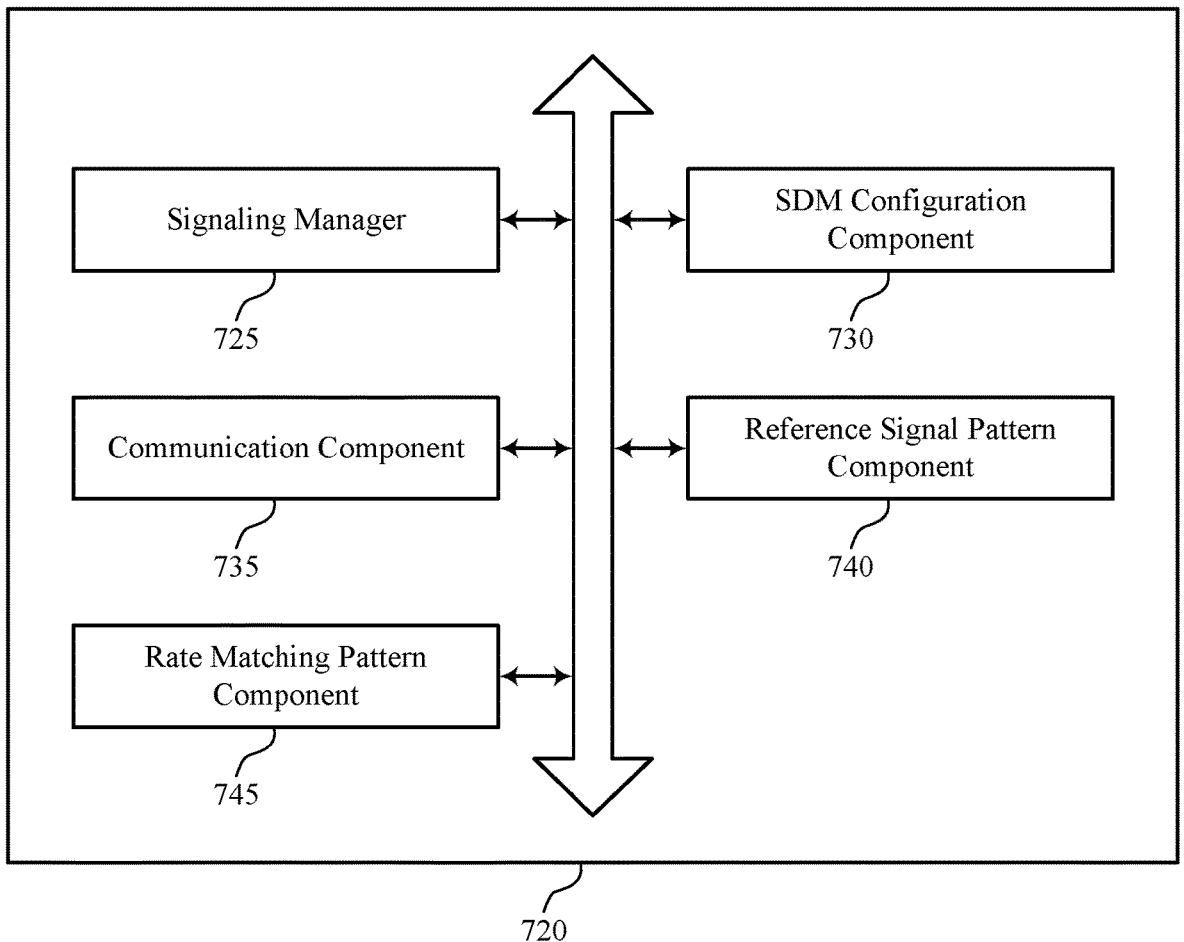
FIG. 7 shows a block diagram of a communications manager that supports dynamic spectrum sharing with spatial division multiplexing in accordance with aspects of the present disclosure.

FIG. 7 shows a block diagram 700 of a communications manager 720 that supports dynamic spectrum sharing with spatial division multiplexing in accordance with aspects of the present disclosure. The communications manager 720 may be an example of aspects of a communications manager 520, a communications manager 620, or both, as described herein. The communications manager 720, or various components thereof, may be an example of means for performing various aspects of dynamic spectrum sharing with spatial division multiplexing as described herein. For example, the communications manager 720 may include a signaling manager 725, an SDM configuration component 730, a communication component 735, a reference signal pattern component 740, a rate matching pattern component 745, or any combination thereof. Each of these components may communicate, directly or indirectly, with one another (e.g., via one or more buses).

The communications manager 720 may support wireless communications at a UE in accordance with examples as disclosed herein. The signaling manager 725 may be configured as or otherwise support a means for receiving, from a base station, an indication of a set of resources to be used for dynamic spectrum sharing communications with the base station. The SDM configuration component 730 may be configured as or otherwise support a means for determining, based on the received indication, a spatial division multiplexing configuration for the dynamic spectrum sharing communications with the base station, where the spatial division multiplexing configuration includes interference measurement resources for the set of resources, rate matching resources for the set of resources, or both. The communication component 735 may be configured as or otherwise support a means for communicating with the base station in accordance with the spatial division multiplexing configuration.

In some examples, the signaling manager 725 may be configured as or otherwise support a means for receiving, via explicit signaling, a notification that a transmission to the UE applies the spatial division multiplexing configuration.

In some examples, the notification indicates that a first communication with the UE via a first radio access technology is multiplexed with a second communication with a second UE via a second radio access technology in accordance with the spatial division multiplexing configuration.

In some examples, the notification includes a location, a scrambling sequence, a transmission power, or any combination thereof, for one or more reference signals configured for transmission in the set of resources.

In some examples, the signaling manager 725 may be configured as or otherwise support a means for receiving, via implicit signaling, a notification that a transmission to the UE applies the spatial division multiplexing configuration.

In some examples, the notification is the spatial division multiplexing configuration.

In some examples, the reference signal pattern component 740 may be configured as or otherwise support a means for determining one or more reference signal patterns associated with the set of resources, where the one or more reference signal patterns include the interference measurement resources, the rate matching resources, or both.

In some examples, the one or more reference signal patterns further include a set of antenna ports associated with one or more demodulation reference signals shared between communications via a first radio access technology and communications via a second radio access technology.

In some examples, the received indication includes a configuration associated with the one or more reference signal patterns.

In some examples, the interference measurement resources are associated with communications via a first radio access technology and communications via a second radio access technology.

In some examples, the interference measurement resources include an NR interference measurement resource, or a resource for measuring interference from and LTE cell-specific reference signal, an LTE non-zero power channel state information reference signal, an LTE sounding reference signal, or any combination thereof.

In some examples, the rate matching resources are associated with an LTE demodulation reference signal, an LTE cell-specific reference signal, a zero power CSI-RS associated with LTE CSI-RS resources, or any combination thereof.

In some examples, the rate matching pattern component 745 may be configured as or otherwise support a means for identifying, in the received indication, a configuration associated with a rate matching pattern for one or more reference signals configured for transmission in the set of resources, where the rate matching pattern is based on a first numerology associated with a first radio access technology and a second numerology associated with a second radio access technology, and where communicating with the base station is further in accordance with the rate matching pattern.

In some examples, the spatial division multiplexing configuration includes a first layer associated with communications via the first radio access technology and a second layer associated with communications via the second radio access technology.

In some examples, the indication is received in a MAC CE, a downlink control information message, a radio resource control configuration message, or any combination thereof.

Figure 8:
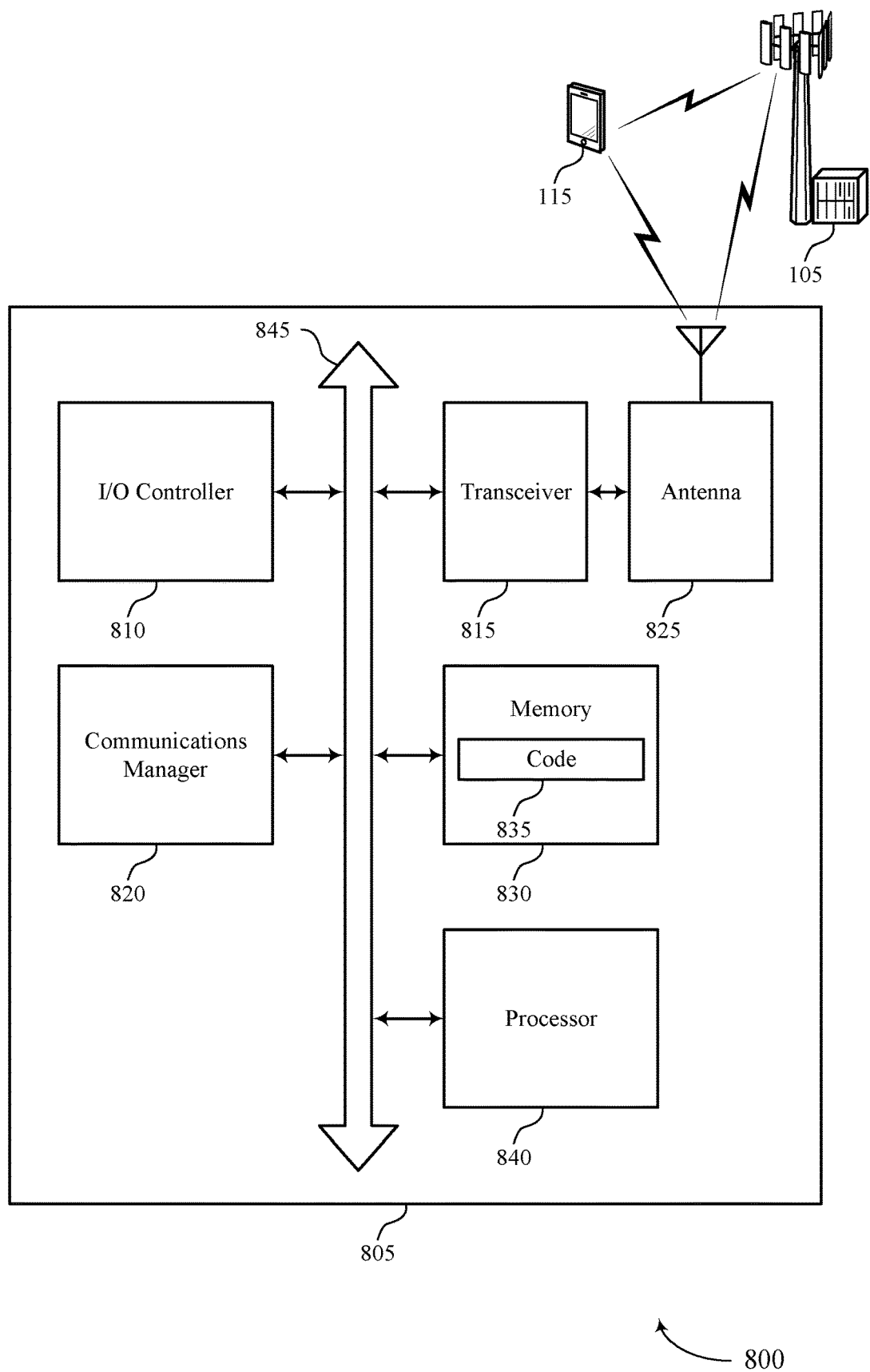
FIG. 8 shows a diagram of a system including a device that supports dynamic spectrum sharing with spatial division multiplexing in accordance with aspects of the present disclosure.

FIG. 8 shows a diagram of a system 800 including a device 805 that supports dynamic spectrum sharing with spatial division multiplexing in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic spectrum sharing with spatial division multiplexing). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, an indication of a set of resources to be used for dynamic spectrum sharing communications with the base station. The communications manager 820 may be configured as or otherwise support a means for determining, based on the received indication, a spatial division multiplexing configuration for the dynamic spectrum sharing communications with the base station, where the spatial division multiplexing configuration includes interference measurement resources for the set of resources, rate matching resources for the set of resources, or both. The communications manager 820 may be configured as or otherwise support a means for communicating with the base station in accordance with the spatial division multiplexing configuration.

By including or configuring the communications manager 820 in accordance with examples as described herein, the device 805 may support techniques for enabling the device 805 to save power and increase battery life by communicating with a base station 105 (as shown in FIG. 1) more efficiently. For example, the device 805 may efficiently communicate with the base station 105 in a set of resources as the device 805 may be able to determine the SDM configuration and map signals to resources more reliably.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of dynamic spectrum sharing with spatial division multiplexing as described herein, or the processor 840 and the memory 830 may be otherwise configured to perform or support such operations.

Figure 9:
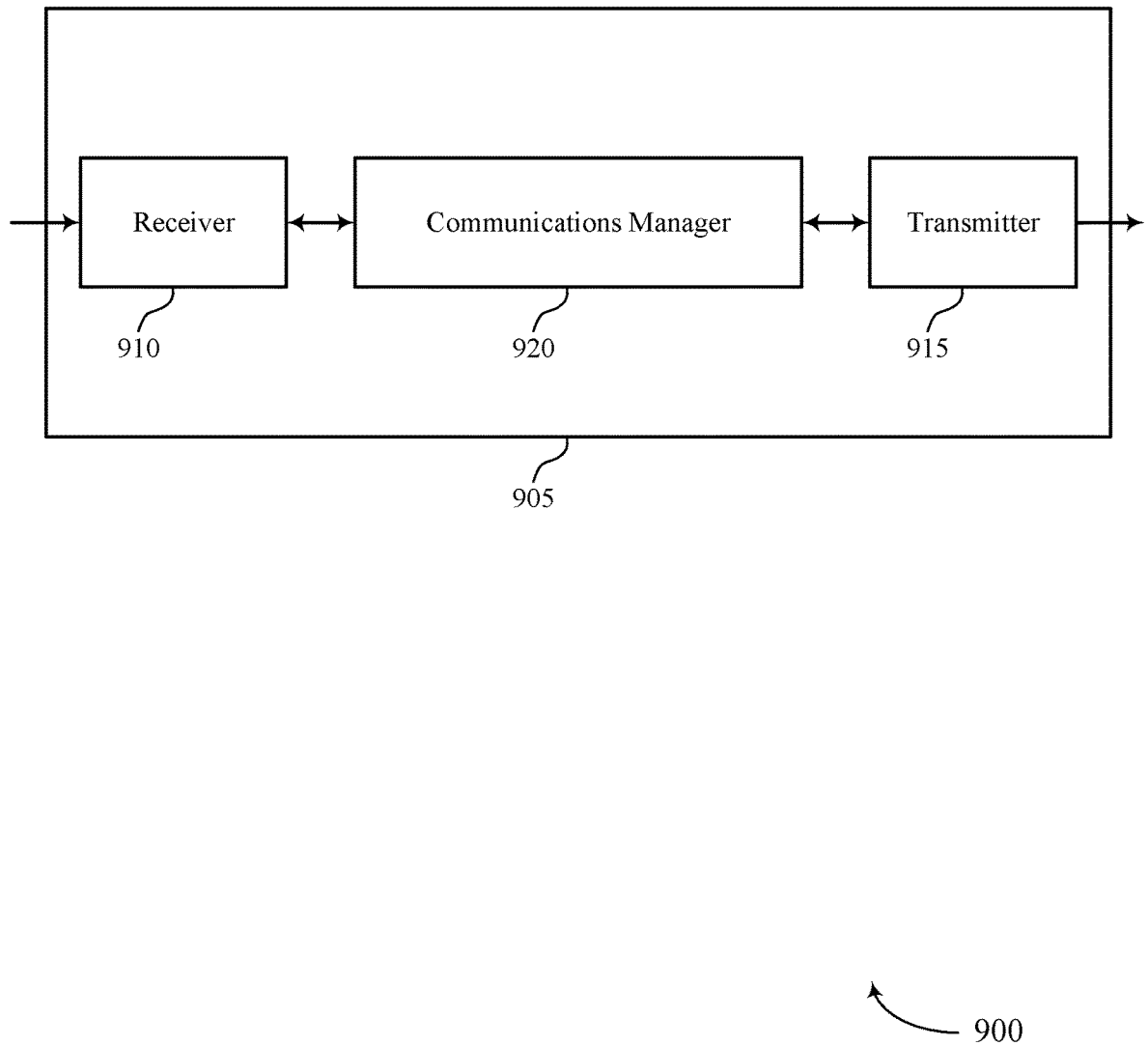
FIGS. 9 and 10 show block diagrams of devices that support dynamic spectrum sharing with spatial division multiplexing in accordance with aspects of the present disclosure.

FIG. 9 shows a block diagram 900 of a device 905 that supports dynamic spectrum sharing with spatial division multiplexing in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic spectrum sharing with spatial division multiplexing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic spectrum sharing with spatial division multiplexing). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of dynamic spectrum sharing with spatial division multiplexing as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for determining a spatial division multiplexing configuration for dynamic spectrum sharing communications with one or more first UEs communicating via a first radio access technology and with one or more second UEs communicating via a second radio access technology. The communications manager 920 may be configured as or otherwise support a means for transmitting, to at least the one or more first UEs, an indication of a set of resources to be used for the dynamic spectrum sharing communications, where the spatial division multiplexing configuration includes interference measurement resources for the set of resources, rate matching resources for the set of resources, or both. The communications manager 920 may be configured as or otherwise support a means for communicating in accordance with the spatial division multiplexing configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources.

Figure 10:
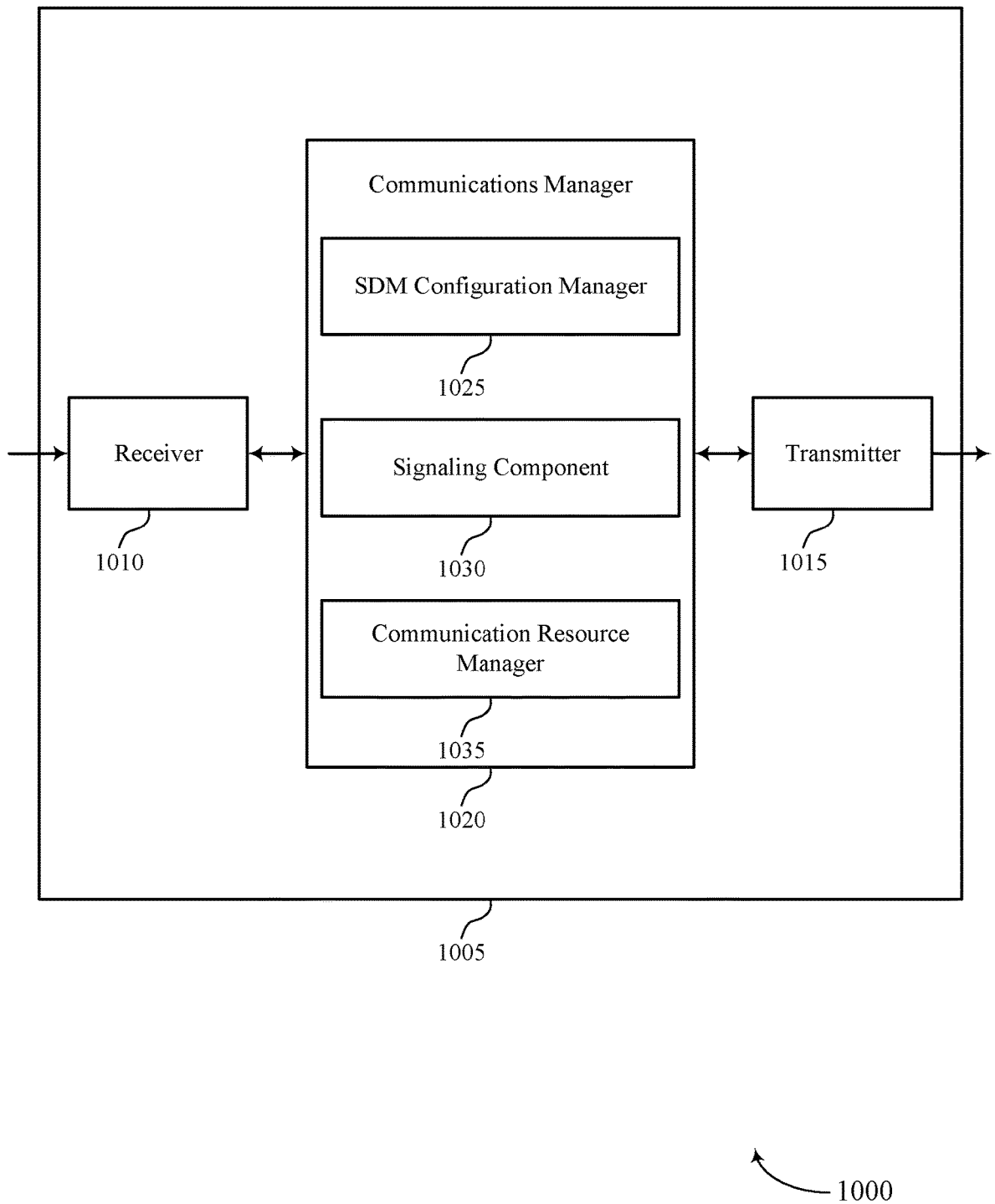

FIG. 10 shows a block diagram 1000 of a device 1005 that supports dynamic spectrum sharing with spatial division multiplexing in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic spectrum sharing with spatial division multiplexing). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic spectrum sharing with spatial division multiplexing). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of dynamic spectrum sharing with spatial division multiplexing as described herein. For example, the communications manager 1020 may include an SDM configuration manager 1025, a signaling component 1030, a communication resource manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The SDM configuration manager 1025 may be configured as or otherwise support a means for determining a spatial division multiplexing configuration for dynamic spectrum sharing communications with one or more first UEs communicating via a first radio access technology and with one or more second UEs communicating via a second radio access technology. The signaling component 1030 may be configured as or otherwise support a means for transmitting, to at least the one or more first UEs, an indication of a set of resources to be used for the dynamic spectrum sharing communications, where the spatial division multiplexing configuration includes interference measurement resources for the set of resources, rate matching resources for the set of resources, or both. The communication resource manager 1035 may be configured as or otherwise support a means for communicating in accordance with the spatial division multiplexing configuration.

Figure 11:
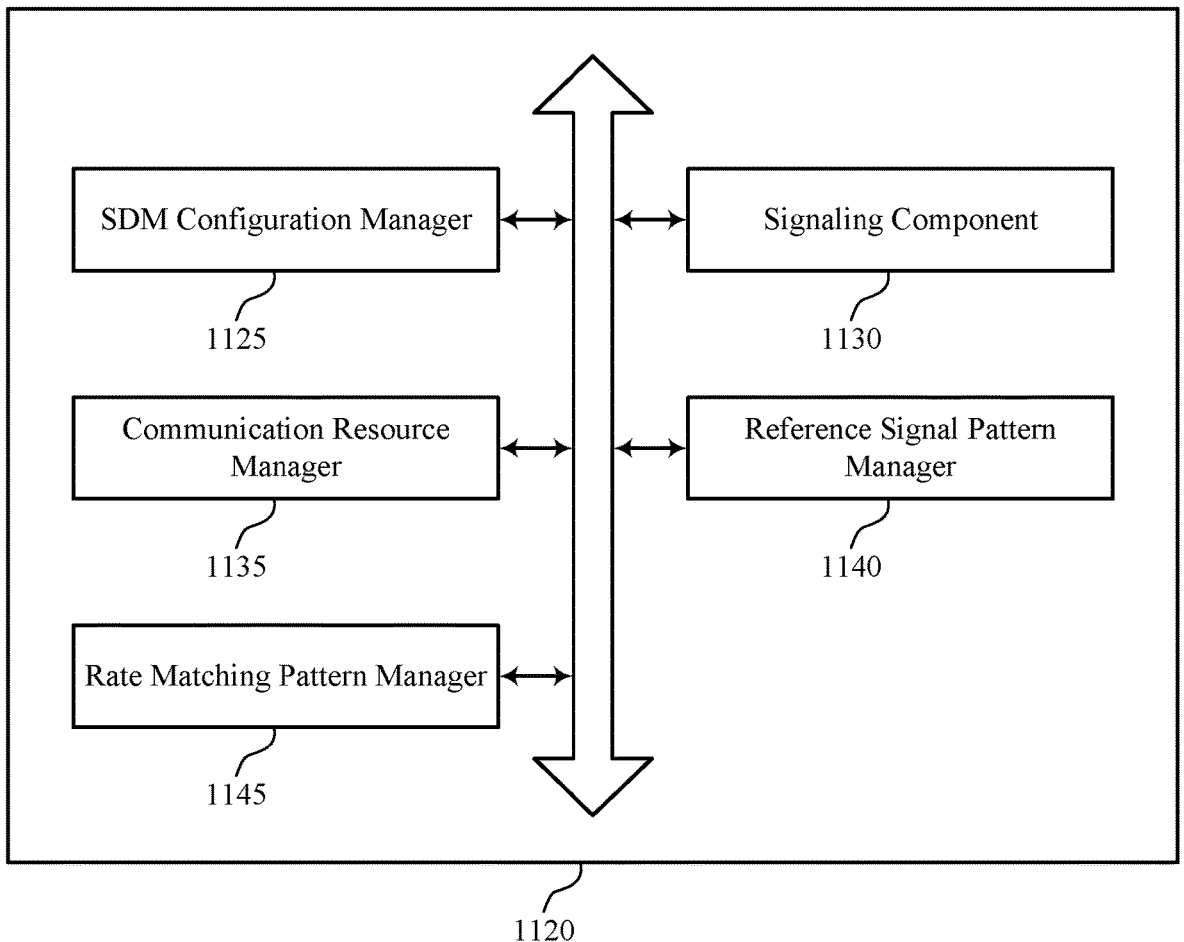
FIG. 11 shows a block diagram of a communications manager that supports dynamic spectrum sharing with spatial division multiplexing in accordance with aspects of the present disclosure.

FIG. 11 shows a block diagram 1100 of a communications manager 1120 that supports dynamic spectrum sharing with spatial division multiplexing in accordance with aspects of the present disclosure. The communications manager 1120 may be an example of aspects of a communications manager 920, a communications manager 1020, or both, as described herein. The communications manager 1120, or various components thereof, may be an example of means for performing various aspects of dynamic spectrum sharing with spatial division multiplexing as described herein. For example, the communications manager 1120 may include an SDM configuration manager 1125, a signaling component 1130, a communication resource manager 1135, a reference signal pattern manager 1140, a rate matching pattern manager 1145, or any combination thereof. Each of these components may communicate, directly or indirectly, with one another (e.g., via one or more buses).

The communications manager 1120 may support wireless communications at a base station in accordance with examples as disclosed herein. The SDM configuration manager 1125 may be configured as or otherwise support a means for determining a spatial division multiplexing configuration for dynamic spectrum sharing communications with one or more first UEs communicating via a first radio access technology and with one or more second UEs communicating via a second radio access technology. The signaling component 1130 may be configured as or otherwise support a means for transmitting, to at least the one or more first UEs, an indication of a set of resources to be used for the dynamic spectrum sharing communications, where the spatial division multiplexing configuration includes interference measurement resources for the set of resources, rate matching resources for the set of resources, or both. The communication resource manager 1135 may be configured as or otherwise support a means for communicating in accordance with the spatial division multiplexing configuration.

In some examples, the signaling component 1130 may be configured as or otherwise support a means for transmitting, via explicit signaling, a notification that a transmission to at least the one or more first UEs applies the spatial division multiplexing configuration.

In some examples, the notification indicates that a first communication with the one or more first UEs via the first radio access technology is multiplexed with a second communication with the one or more second UEs via the second radio access technology in accordance with the spatial division multiplexing configuration.

In some examples, the notification includes a location, a scrambling sequence, a transmission power, or any combination thereof, for one or more reference signals configured for transmission in the set of resources.

In some examples, the signaling component 1130 may be configured as or otherwise support a means for transmitting, via implicit signaling, a notification that a transmission to at least the one or more first UEs applies the spatial division multiplexing configuration.

In some examples, the notification is the spatial division multiplexing configuration.

In some examples, the reference signal pattern manager 1140 may be configured as or otherwise support a means for determining one or more reference signal patterns associated with the set of resources, where the one or more reference signal patterns include the interference measurement resources, the rate matching resources, or both.

In some examples, the one or more reference signal patterns further include a set of antenna ports associated with one or more demodulation reference signals shared between communications via the first radio access technology and communications via the second radio access technology.

In some examples, the transmitted indication includes a configuration associated with the one or more reference signal patterns.

In some examples, the interference measurement resources are associated with communications via the first radio access technology and communications via the second radio access technology.

In some examples, the interference measurement resources include an NR interference measurement resource, or a resource for measuring interference from an LTE cell-specific reference signal, an LTE non-zero power channel state information reference signal, an LTE sounding reference signal, or any combination thereof.

In some examples, the rate matching resources are associated with an LTE demodulation reference signal, an LTE cell-specific reference signal, a zero power CSI-RS associated with LTE CSI-RS resources, or any combination thereof.

In some examples, the rate matching pattern manager 1145 may be configured as or otherwise support a means for determining a first numerology associated with the first radio access technology and a second numerology associated with the second radio access technology. In some examples, the rate matching pattern manager 1145 may be configured as or otherwise support a means for determining a rate matching pattern for one or more reference signals configured for transmission in the set of resources based on the first numerology and the second numerology, where the transmitted indication includes a configuration associated with the rate matching pattern.

In some examples, the rate matching pattern includes an NR demodulation reference signal rate matching pattern associated with interference between communications via the first radio access technology and communications via the second radio access technology.

In some examples, the communication resource manager 1135 may be configured as or otherwise support a means for puncturing one or more resource elements of the set of resources based on interference between communications via the first radio access technology and communications via the second radio access technology.

In some examples, the one or more resource elements are allocated for communications via an LTE radio access technology. In some examples, the first radio access technology or the second radio access technology includes the LTE radio access technology.

In some examples, the signaling component 1130 may be configured as or otherwise support a means for transmitting, to the one or more second UEs, the indication of the set of resources to be used for the dynamic spectrum sharing communications.

In some examples, at least one UE of the one or more first UEs is included in the one or more second UEs.

In some examples, the spatial division multiplexing configuration includes a first layer associated with communications via the first radio access technology and a second layer associated with communications via the second radio access technology.

In some examples, the spatial division multiplexing configuration is an orthogonal configuration or a non-orthogonal configuration associated with communications via the first radio access technology and communications via the second radio access technology.

In some examples, the indication is transmitted in a medium access control (MAC) control element (CE), a downlink control information message, a radio resource control configuration message, or any combination thereof.

Figure 12:
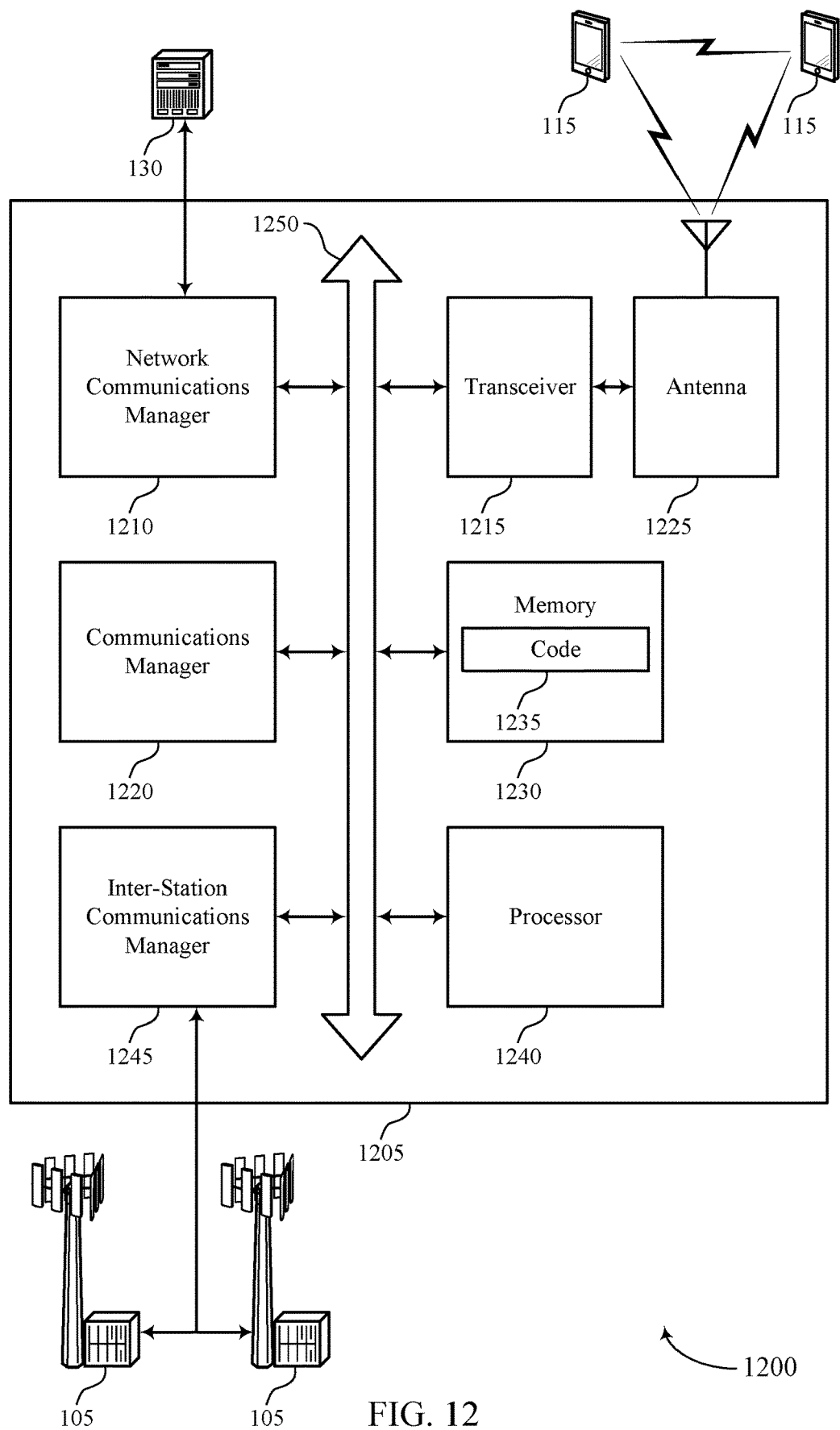
FIG. 12 shows a diagram of a system including a device that supports dynamic spectrum sharing with spatial division multiplexing in accordance with aspects of the present disclosure.

FIG. 12 shows a diagram of a system 1200 including a device 1205 that supports dynamic spectrum sharing with spatial division multiplexing in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic spectrum sharing with spatial division multiplexing). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for determining a spatial division multiplexing configuration for dynamic spectrum sharing communications with one or more first UEs communicating via a first radio access technology and with one or more second UEs communicating via a second radio access technology. The communications manager 1220 may be configured as or otherwise support a means for transmitting, to at least the one or more first UEs, an indication of a set of resources to be used for the dynamic spectrum sharing communications, where the spatial division multiplexing configuration includes interference measurement resources for the set of resources, rate matching resources for the set of resources, or both. The communications manager 1220 may be configured as or otherwise support a means for communicating in accordance with the spatial division multiplexing configuration.

By including or configuring the communications manager 1220 in accordance with examples as described herein, the device 1205 may support techniques for enabling the device 1205 to save power by communicating with a UE 115 (as shown in FIG. 1) more efficiently. For example, the device 1205 may improve reliability in communications with a UE 115, as the device 1205 may be able to determine and indicate and SDM configuration for communicating with the UE in a set of resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of dynamic spectrum sharing with spatial division multiplexing as described herein, or the processor 1240 and the memory 1230 may be otherwise configured to perform or support such operations.

Figure 13:
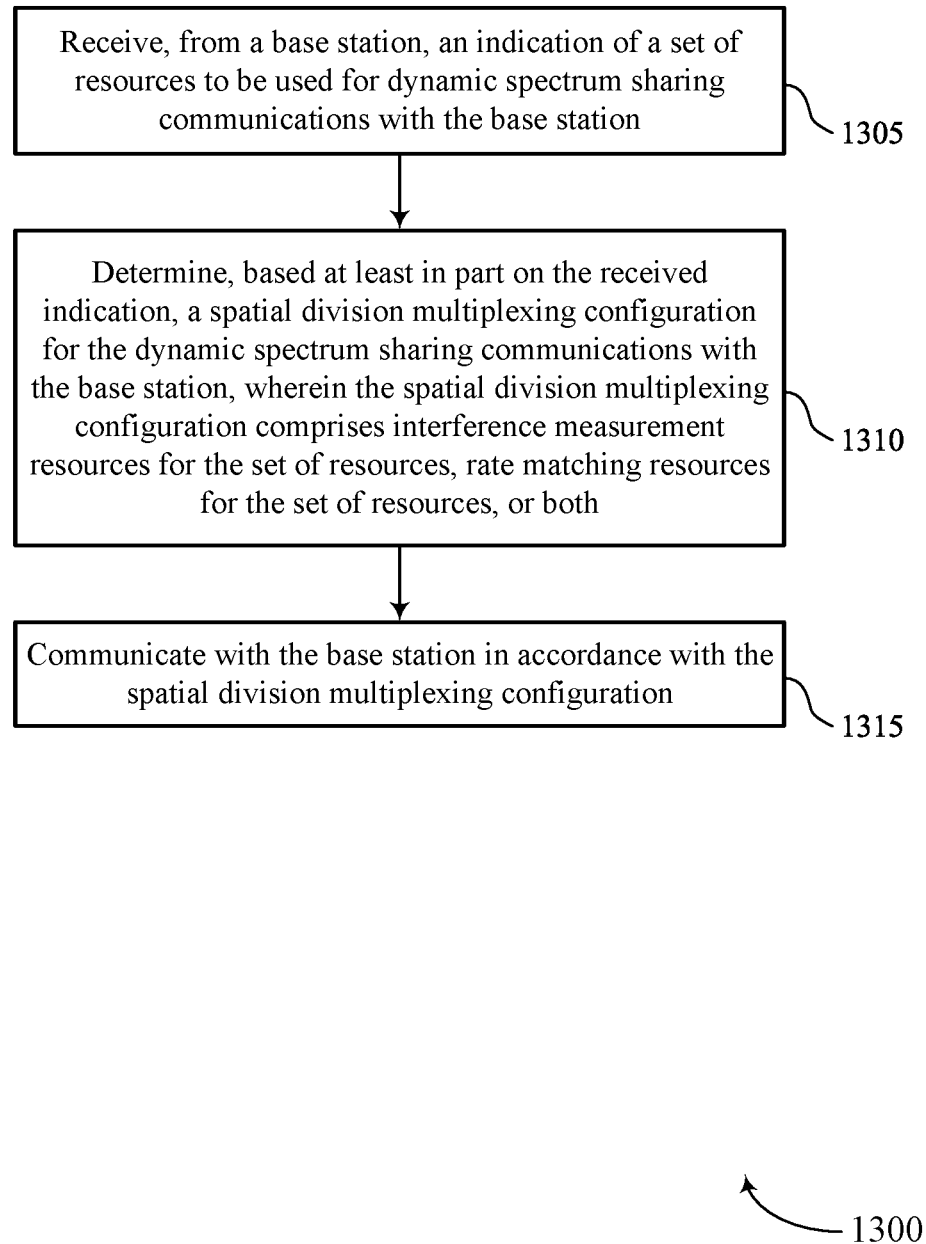
FIGS. 13 through 18 show flowcharts illustrating methods that support dynamic spectrum sharing with spatial division multiplexing in accordance with aspects of the present disclosure.

FIG. 13 shows a flowchart illustrating a method 1300 that supports dynamic spectrum sharing with spatial division multiplexing in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a set of resources to be used for dynamic spectrum sharing communications with the base station. The operations of 1305 may be performed in accordance with examples as disclosed herein. In some examples, aspects of the operations of 1305 may be performed by a signaling manager 725 as described with reference to FIG. 7.

At 1310, the method may include determining, based on the received indication, a spatial division multiplexing configuration for the dynamic spectrum sharing communications with the base station, where the spatial division multiplexing configuration includes interference measurement resources for the set of resources, rate matching resources for the set of resources, or both. The operations of 1310 may be performed in accordance with examples as disclosed herein. In some examples, aspects of the operations of 1310 may be performed by an SDM configuration component 730 as described with reference to FIG. 7.

At 1315, the method may include communicating with the base station in accordance with the spatial division multiplexing configuration. The operations of 1315 may be performed in accordance with examples as disclosed herein. In some examples, aspects of the operations of 1315 may be performed by a communication component 735 as described with reference to FIG. 7.

Figure 14:
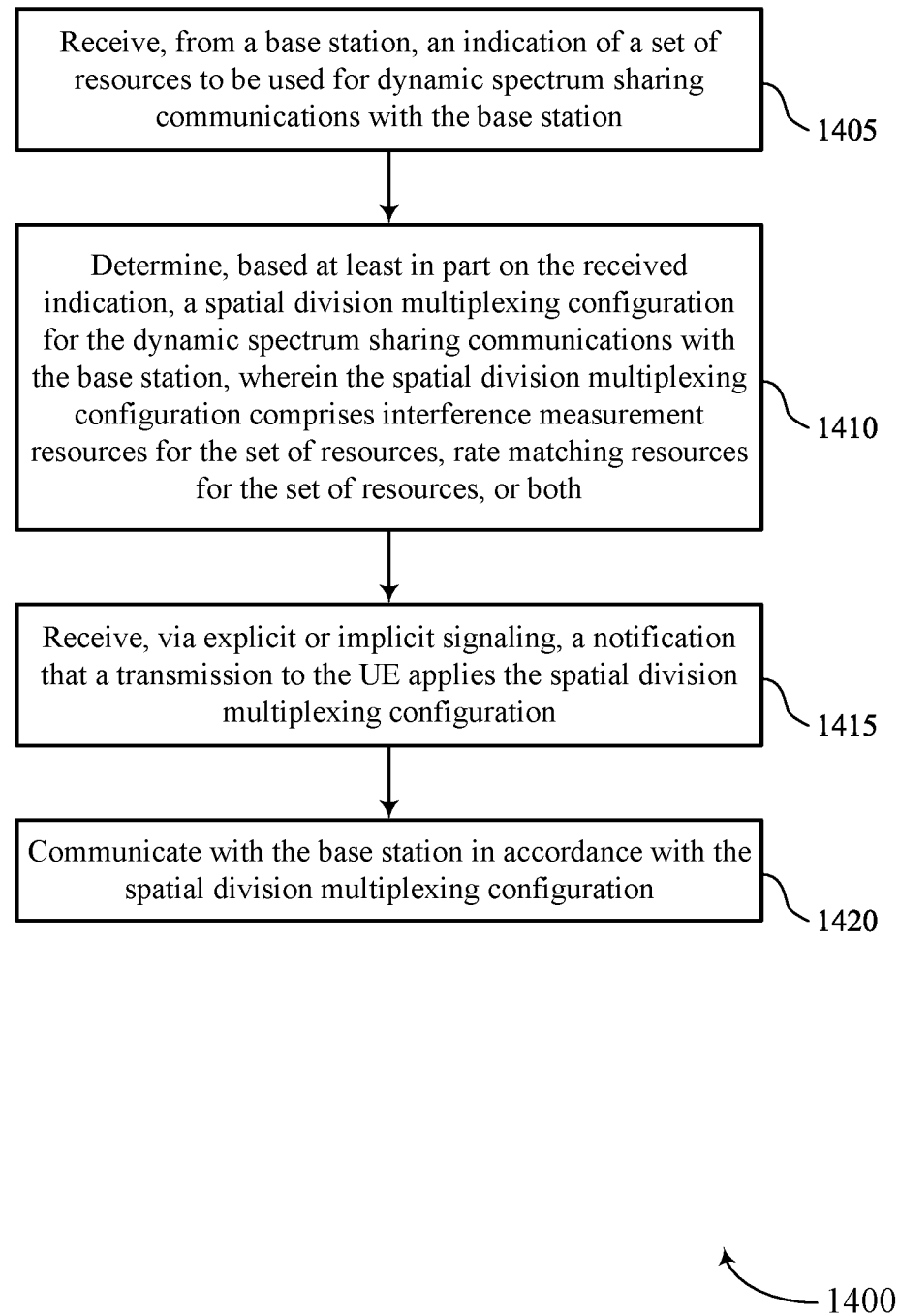

FIG. 14 shows a flowchart illustrating a method 1400 that supports dynamic spectrum sharing with spatial division multiplexing in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a set of resources to be used for dynamic spectrum sharing communications with the base station. The operations of 1405 may be performed in accordance with examples as disclosed herein. In some examples, aspects of the operations of 1405 may be performed by a signaling manager 725 as described with reference to FIG. 7.

At 1410, the method may include determining, based on the received indication, a spatial division multiplexing configuration for the dynamic spectrum sharing communications with the base station, where the spatial division multiplexing configuration includes interference measurement resources for the set of resources, rate matching resources for the set of resources, or both. The operations of 1410 may be performed in accordance with examples as disclosed herein. In some examples, aspects of the operations of 1410 may be performed by an SDM configuration component 730 as described with reference to FIG. 7.

At 1415, the method may include receiving, via explicit or implicit signaling, a notification that a transmission to the UE applies the spatial division multiplexing configuration. The operations of 1415 may be performed in accordance with examples as disclosed herein. In some examples, aspects of the operations of 1415 may be performed by a signaling manager 725 as described with reference to FIG. 7.

At 1420, the method may include communicating with the base station in accordance with the spatial division multiplexing configuration. The operations of 1420 may be performed in accordance with examples as disclosed herein. In some examples, aspects of the operations of 1420 may be performed by a communication component 735 as described with reference to FIG. 7.

Figure 15:
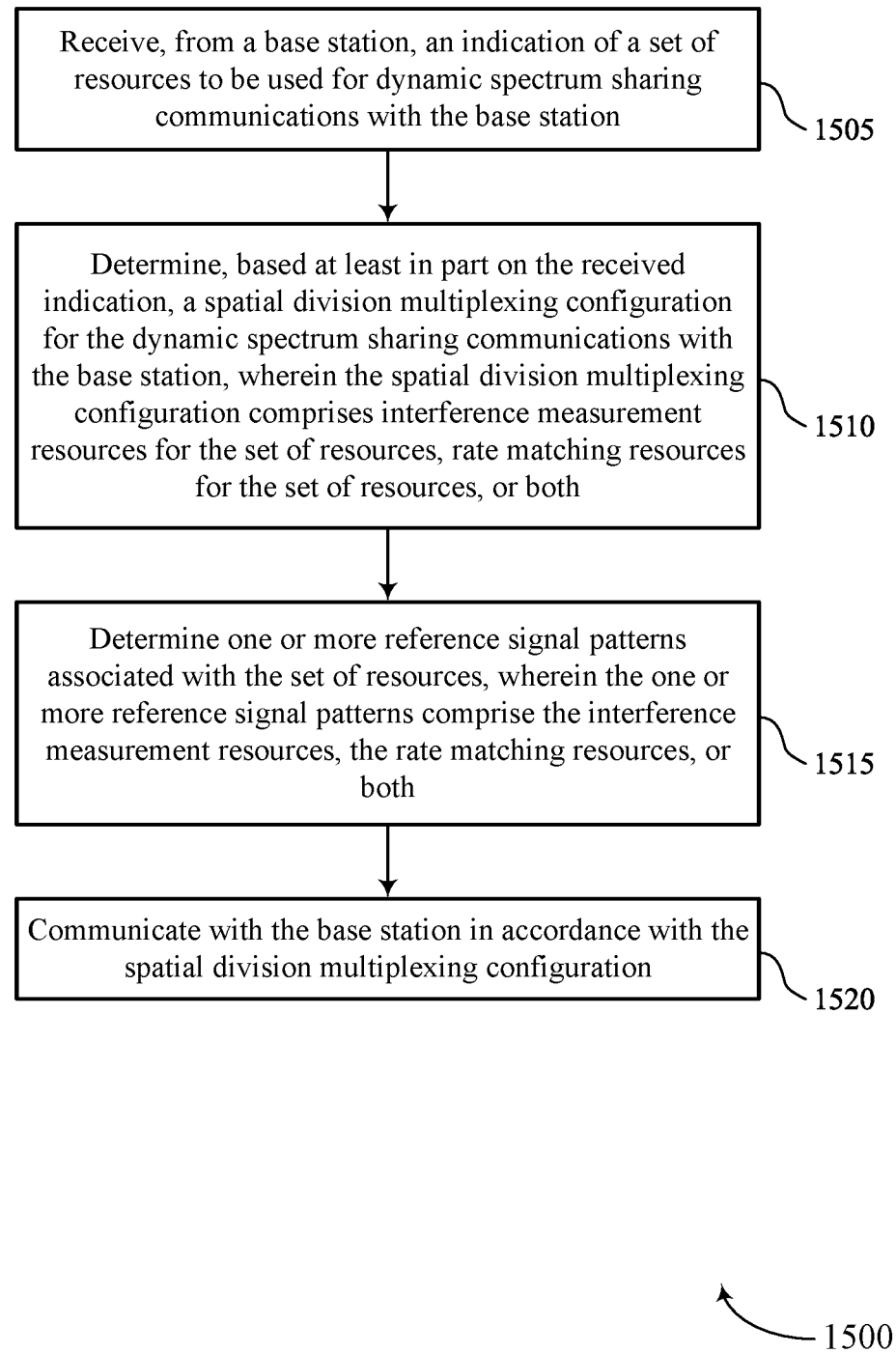

FIG. 15 shows a flowchart illustrating a method 1500 that supports dynamic spectrum sharing with spatial division multiplexing in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication of a set of resources to be used for dynamic spectrum sharing communications with the base station. The operations of 1505 may be performed in accordance with examples as disclosed herein. In some examples, aspects of the operations of 1505 may be performed by a signaling manager 725 as described with reference to FIG. 7.

At 1510, the method may include determining, based on the received indication, a spatial division multiplexing configuration for the dynamic spectrum sharing communications with the base station, where the spatial division multiplexing configuration includes interference measurement resources for the set of resources, rate matching resources for the set of resources, or both. The operations of 1510 may be performed in accordance with examples as disclosed herein. In some examples, aspects of the operations of 1510 may be performed by an SDM configuration component 730 as described with reference to FIG. 7.

At 1515, the method may include determining one or more reference signal patterns associated with the set of resources, where the one or more reference signal patterns include the interference measurement resources, the rate matching resources, or both. The operations of 1515 may be performed in accordance with examples as disclosed herein. In some examples, aspects of the operations of 1515 may be performed by a reference signal pattern component 740 as described with reference to FIG. 7.

At 1520, the method may include communicating with the base station in accordance with the spatial division multiplexing configuration. The operations of 1520 may be performed in accordance with examples as disclosed herein. In some examples, aspects of the operations of 1520 may be performed by a communication component 735 as described with reference to FIG. 7.

Figure 16:
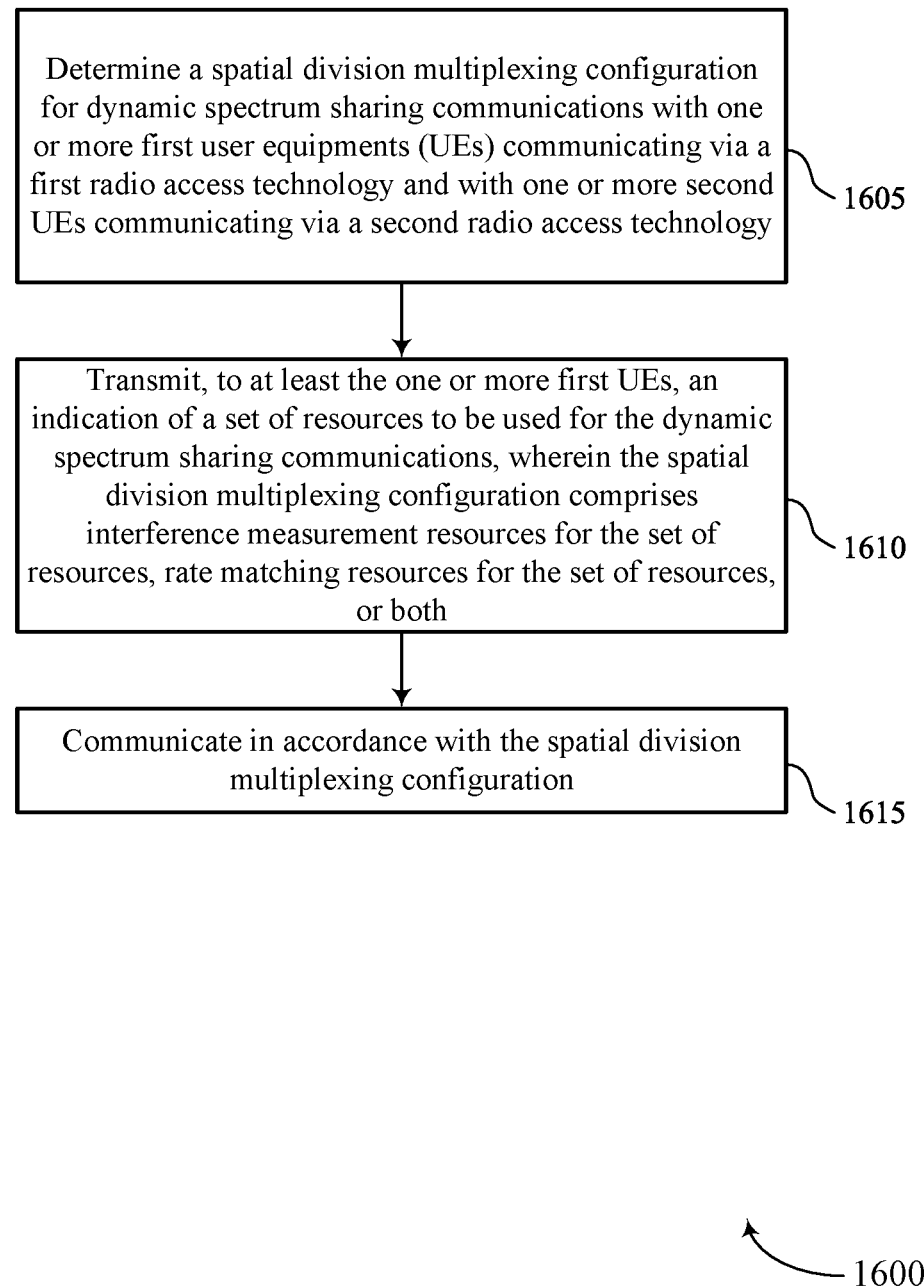

FIG. 16 shows a flowchart illustrating a method 1600 that supports dynamic spectrum sharing with spatial division multiplexing in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include determining a spatial division multiplexing configuration for dynamic spectrum sharing communications with one or more first user UEs communicating via a first radio access technology and with one or more second UEs communicating via a second radio access technology. The operations of 1605 may be performed in accordance with examples as disclosed herein. In some examples, aspects of the operations of 1605 may be performed by an SDM configuration manager 1125 as described with reference to FIG. 11.

At 1610, the method may include transmitting, to at least the one or more first UEs, an indication of a set of resources to be used for the dynamic spectrum sharing communications, where the spatial division multiplexing configuration includes interference measurement resources for the set of resources, rate matching resources for the set of resources, or both. The operations of 1610 may be performed in accordance with examples as disclosed herein. In some examples, aspects of the operations of 1610 may be performed by a signaling component 1130 as described with reference to FIG. 11.

At 1615, the method may include communicating in accordance with the spatial division multiplexing configuration. The operations of 1615 may be performed in accordance with examples as disclosed herein. In some examples, aspects of the operations of 1615 may be performed by a communication resource manager 1135 as described with reference to FIG. 11.

Figure 17:
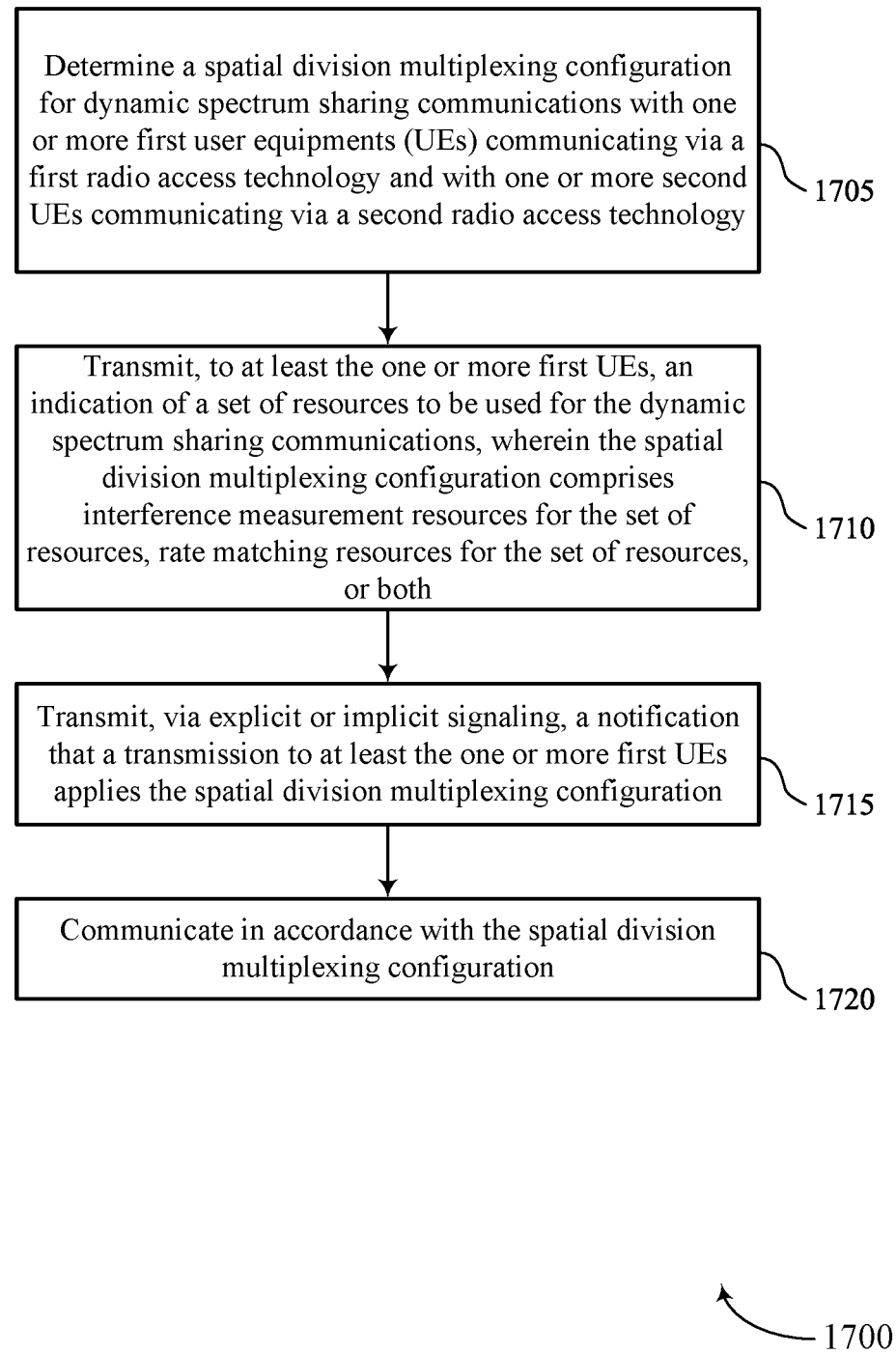

FIG. 17 shows a flowchart illustrating a method 1700 that supports dynamic spectrum sharing with spatial division multiplexing in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include determining a spatial division multiplexing configuration for dynamic spectrum sharing communications with one or more first user UEs communicating via a first radio access technology and with one or more second UEs communicating via a second radio access technology. The operations of 1705 may be performed in accordance with examples as disclosed herein. In some examples, aspects of the operations of 1705 may be performed by an SDM configuration manager 1125 as described with reference to FIG. 11.

At 1710, the method may include transmitting, to at least the one or more first UEs, an indication of a set of resources to be used for the dynamic spectrum sharing communications, where the spatial division multiplexing configuration includes interference measurement resources for the set of resources, rate matching resources for the set of resources, or both. The operations of 1710 may be performed in accordance with examples as disclosed herein. In some examples, aspects of the operations of 1710 may be performed by a signaling component 1130 as described with reference to FIG. 11.

At 1715, the method may include transmitting, via explicit or implicit signaling, a notification that a transmission to at least the one or more first UEs applies the spatial division multiplexing configuration. The operations of 1715 may be performed in accordance with examples as disclosed herein. In some examples, aspects of the operations of 1715 may be performed by a signaling component 1130 as described with reference to FIG. 11.

At 1720, the method may include communicating in accordance with the spatial division multiplexing configuration. The operations of 1720 may be performed in accordance with examples as disclosed herein. In some examples, aspects of the operations of 1720 may be performed by a communication resource manager 1135 as described with reference to FIG. 11.

Figure 18:
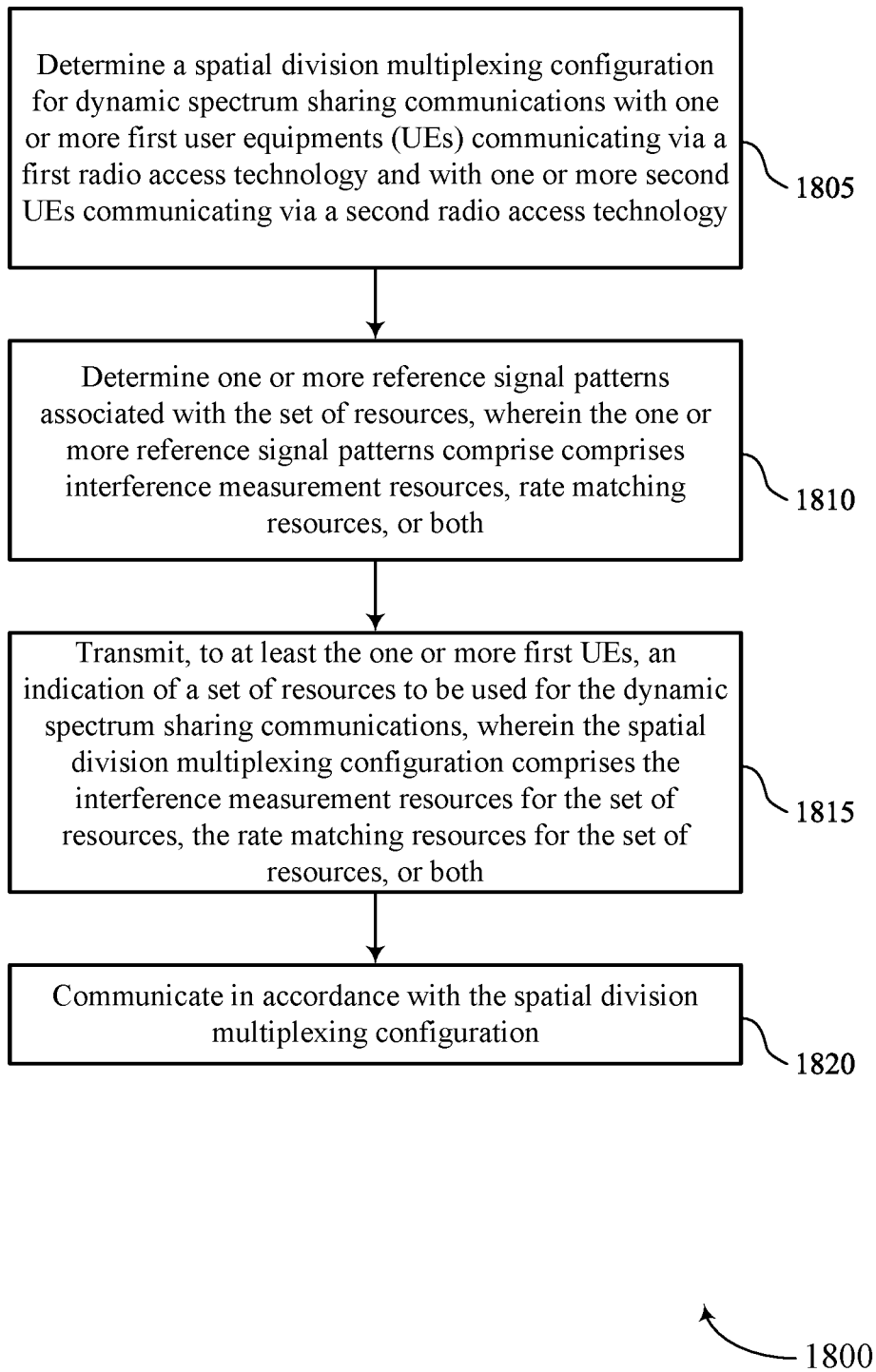

FIG. 18 shows a flowchart illustrating a method 1800 that supports dynamic spectrum sharing with spatial division multiplexing in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include determining a spatial division multiplexing configuration for dynamic spectrum sharing communications with one or more first UEs communicating via a first radio access technology and with one or more second UEs communicating via a second radio access technology. The operations of 1805 may be performed in accordance with examples as disclosed herein. In some examples, aspects of the operations of 1805 may be performed by an SDM configuration manager 1125 as described with reference to FIG. 11.

At 1810, the method may include determining one or more reference signal patterns associated with the set of resources, where the one or more reference signal patterns include interference measurement resources, rate matching resources, or both. The operations of 1810 may be performed in accordance with examples as disclosed herein. In some examples, aspects of the operations of 1810 may be performed by a reference signal pattern manager 1140 as described with reference to FIG. 11.

At 1815, the method may include transmitting, to at least the one or more first UEs, an indication of a set of resources to be used for the dynamic spectrum sharing communications, where the spatial division multiplexing configuration includes the interference measurement resources for the set of resources, the rate matching resources for the set of resources, or both. The operations of 1815 may be performed in accordance with examples as disclosed herein. In some examples, aspects of the operations of 1815 may be performed by a signaling component 1130 as described with reference to FIG. 11.

At 1820, the method may include communicating in accordance with the spatial division multiplexing configuration. The operations of 1820 may be performed in accordance with examples as disclosed herein. In some examples, aspects of the operations of 1820 may be performed by a communication resource manager 1135 as described with reference to FIG. 11.

The following provides an overview of aspects of the present disclosure:

Aspect 1: A method for wireless communications at a UE, comprising: receiving, from a base station, an indication of a set of resources to be used for dynamic spectrum sharing communications with the base station; determining, based at least in part on the received indication, a spatial division multiplexing configuration for the dynamic spectrum sharing communications with the base station, wherein the spatial division multiplexing configuration comprises interference measurement resources for the set of resources, rate matching resources for the set of resources, or both; and communicating with the base station in accordance with the spatial division multiplexing configuration.

Aspect 2: The method of aspect 1, further comprising: receiving, via explicit signaling, a notification that a transmission to the UE applies the spatial division multiplexing configuration.

Aspect 3: The method of aspect 2, wherein the notification indicates that a first communication with the UE via a first radio access technology is multiplexed with a second communication with a second UE via a second radio access technology in accordance with the spatial division multiplexing configuration.

Aspect 4: The method of any of aspects 2 through 3, wherein the notification includes a location, a scrambling sequence, a transmission power, or any combination thereof, for one or more reference signals configured for transmission in the set of resources.

Aspect 5: The method of any of aspects 1 through 4, further comprising: receiving, via implicit signaling, a notification that a transmission to the UE applies the spatial division multiplexing configuration.

Aspect 6: The method of aspect 5, wherein the notification is the spatial division multiplexing configuration.

Aspect 7: The method of any of aspects 1 through 6, further comprising: determining one or more reference signal patterns associated with the set of resources, wherein the one or more reference signal patterns comprise the interference measurement resources, the rate matching resources, or both.

Aspect 8: The method of aspect 7, wherein the one or more reference signal patterns further comprise a set of antenna ports associated with one or more demodulation reference signals shared between communications via a first radio access technology and communications via a second radio access technology.

Aspect 9: The method of any of aspects 7 through 8, wherein the received indication comprises a configuration associated with the one or more reference signal patterns.

Aspect 10: The method of any of aspects 1 through 9, wherein the interference measurement resources are associated with communications via a first radio access technology and communications via a second radio access technology.

Aspect 11: The method of any of aspects 1 through 10, wherein the interference measurement resources include a New Radio (NR) interference measurement resource, or a resource for measuring interference from a Long Term Evolution (LTE) cell-specific reference signal, an LTE non-zero power channel state information reference signal, an LTE sounding reference signal, or any combination thereof.

Aspect 12: The method of any of aspects 1 through 11, wherein the rate matching resources are associated with an LTE demodulation reference signal, an LTE cell-specific reference signal, a zero power channel state information reference signal (CSI-RS) associated with LTE CSI-RS resources, or any combination thereof.

Aspect 13: The method of any of aspects 1 through 12, further comprising: identifying, in the received indication, a configuration associated with a rate matching pattern for one or more reference signals configured for transmission in the set of resources, wherein the rate matching pattern is based at least in part on a first numerology associated with a first radio access technology and a second numerology associated with a second radio access technology, and wherein communicating with the base station is further in accordance with the rate matching pattern.

Aspect 14: The method of any of aspects 1 through 13, wherein the spatial division multiplexing configuration comprises a first layer associated with communications via the first radio access technology and a second layer associated with communications via the second radio access technology.

Aspect 15: The method of any of aspects 1 through 14, wherein the indication is received in a medium access control (MAC) control element (CE), a downlink control information message, a radio resource control configuration message, or any combination thereof.

Aspect 16: A method for wireless communications at a base station, comprising: determining a spatial division multiplexing configuration for dynamic spectrum sharing communications with one or more first user equipments (UEs) communicating via a first radio access technology and with one or more second UEs communicating via a second radio access technology; transmitting, to at least the one or more first UEs, an indication of a set of resources to be used for the dynamic spectrum sharing communications, wherein the spatial division multiplexing configuration comprises interference measurement resources for the set of resources, rate matching resources for the set of resources, or both; and communicating in accordance with the spatial division multiplexing configuration.

Aspect 17: The method of aspect 16, further comprising: transmitting, via explicit signaling, a notification that a transmission to at least the one or more first UEs applies the spatial division multiplexing configuration.

Aspect 18: The method of aspect 17, wherein the notification indicates that a first communication with the one or more first UEs via the first radio access technology is multiplexed with a second communication with the one or more second UEs via the second radio access technology in accordance with the spatial division multiplexing configuration.

Aspect 19: The method of any of aspects 17 through 18, wherein the notification includes a location, a scrambling sequence, a transmission power, or any combination thereof, for one or more reference signals configured for transmission in the set of resources.

Aspect 20: The method of any of aspects 16 through 19, further comprising: transmitting, via implicit signaling, a notification that a transmission to at least the one or more first UEs applies the spatial division multiplexing configuration.

Aspect 21: The method of aspect 20, wherein the notification is the spatial division multiplexing configuration.

Aspect 22: The method of any of aspects 16 through 21, further comprising: determining one or more reference signal patterns associated with the set of resources, wherein the one or more reference signal patterns comprise the interference measurement resources, the rate matching resources, or both.

Aspect 23: The method of aspect 22, wherein the one or more reference signal patterns further comprise a set of antenna ports associated with one or more demodulation reference signals shared between communications via the first radio access technology and communications via the second radio access technology.

Aspect 24: The method of any of aspects 22 through 23, wherein the transmitted indication comprises a configuration associated with the one or more reference signal patterns.

Aspect 25: The method of any of aspects 16 through 24, wherein the interference measurement resources are associated with communications via the first radio access technology and communications via the second radio access technology.

Aspect 26: The method of any of aspects 16 through 25, wherein the interference measurement resources include a New Radio (NR) interference measurement resource, or a resource for measuring interference from a Long Term Evolution (LTE) cell-specific reference signal, an LTE non-zero power channel state information reference signal, an LTE sounding reference signal, or any combination thereof.

Aspect 27: The method of any of aspects 16 through 26, wherein the rate matching resources are associated with an LTE demodulation reference signal, an LTE cell-specific reference signal, a zero power channel state information reference signal (CSI-RS) associated with LTE CSI-RS resources, or any combination thereof.

Aspect 28: The method of any of aspects 16 through 27, further comprising: determining a first numerology associated with the first radio access technology and a second numerology associated with the second radio access technology; and determining a rate matching pattern for one or more reference signals configured for transmission in the set of resources based at least in part on the first numerology and the second numerology, wherein the transmitted indication comprises a configuration associated with the rate matching pattern.

Aspect 29: The method of aspect 28, wherein the rate matching pattern comprises a New Radio (NR) demodulation reference signal rate matching pattern associated with interference between communications via the first radio access technology and communications via the second radio access technology.

Aspect 30: The method of any of aspects 16 through 29, further comprising: puncturing one or more resource elements of the set of resources based at least in part on interference between communications via the first radio access technology and communications via the second radio access technology.

Aspect 31: The method of aspect 30, wherein the one or more resource elements are allocated for communications via an LTE radio access technology; and the first radio access technology or the second radio access technology comprises the LTE radio access technology.

Aspect 32: The method of any of aspects 16 through 31, further comprising: transmitting, to the one or more second UEs, the indication of the set of resources to be used for the dynamic spectrum sharing communications.

Aspect 33: The method of aspect 32, wherein at least one UE of the one or more first UEs is included in the one or more second UEs.

Aspect 34: The method of any of aspects 16 through 33, wherein the spatial division multiplexing configuration comprises a first layer associated with communications via the first radio access technology and a second layer associated with communications via the second radio access technology.

Aspect 35: The method of any of aspects 16 through 34, wherein the spatial division multiplexing configuration is an orthogonal configuration or a non-orthogonal configuration associated with communications via the first radio access technology and communications via the second radio access technology.

Aspect 36: The method of any of aspects 16 through 35, wherein the indication is transmitted in a medium access control (MAC) control element (CE), a downlink control information message, a radio resource control configuration message, or any combination thereof.

Aspect 37: An apparatus for wireless communications at a UE, comprising a processor; memory coupled with the processor; and instructions stored in the memory and executable by the processor to cause the apparatus to perform a method of any of aspects 1 through 15.

Aspect 38: An apparatus for wireless communications at a UE, comprising at least one means for performing a method of any of aspects 1 through 15.

Aspect 39: A non-transitory computer-readable medium storing code for wireless communications at a UE, the code comprising instructions executable by a processor to perform a method of any of aspects 1 through 15.

Aspect 40: An apparatus for wireless communications at a base station, comprising a processor; memory coupled with the processor; and instructions stored in the memory and executable by the processor to cause the apparatus to perform a method of any of aspects 16 through 36.

Aspect 41: An apparatus for wireless communications at a base station, comprising at least one means for performing a method of any of aspects 16 through 36.

Aspect 42: A non-transitory computer-readable medium storing code for wireless communications at a base station, the code comprising instructions executable by a processor to perform a method of any of aspects 16 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network device, an indication of a set of resources to be used for dynamic spectrum sharing communications with the network device;
   determining, based at least in part on the indication, a spatial division multiplexing configuration comprising interference measurement resources for the set of resources, rate matching resources for the set of resources, or both;
   receiving a notification that a first communication between the UE and the network device applies the spatial division multiplexing configuration; and
   performing, based at least in part on the notification, the first communication on the set of resources via a first spatial layer associated with the first radio access technology in accordance with the spatial division multiplexing configuration, the first communication being multiplexed on the set of resources with a second communication between a second UE and the network device via a second radio access technology using a second spatial layer associated with the second radio access technology.

2. The method of claim 1, further comprising:
receiving, via explicit signaling, the notification that the first communication applies the spatial division multiplexing configuration.

3. The method of claim 2, wherein the notification indicates that the first communication with the UE via the first radio access technology is multiplexed with the second communication with the second UE via the second radio access technology in accordance with the spatial division multiplexing configuration.

4. The method of claim 2, wherein the notification includes a location, a scrambling sequence, a transmission power, or any combination thereof, for one or more reference signals configured for the transmission in the set of resources.

5. The method of claim 1, further comprising:
receiving, via implicit signaling, the notification that the first communication applies the spatial division multiplexing configuration.

6. The method of claim 1, further comprising:
determining one or more reference signal patterns associated with the set of resources, wherein the one or more reference signal patterns comprise the interference measurement resources, the rate matching resources, or both.

7. The method of claim 6, wherein the one or more reference signal patterns further comprise a set of antenna ports associated with one or more demodulation reference signals shared between the first communication via the first radio access technology and the second communication via the second radio access technology.

8. The method of claim 6, wherein the indication comprises a configuration associated with the one or more reference signal patterns.

9. The method of claim 1, wherein the interference measurement resources are associated with the first communication via the first radio access technology and the second communication via the second radio access technology.

10. The method of claim 1, wherein the interference measurement resources include a New Radio (NR) interference measurement resource, or a resource for measuring interference from a Long Term Evolution (LTE) cell-specific reference signal, an LTE non-zero power channel state information reference signal, an LTE sounding reference signal, or any combination thereof.

11. The method of claim 1, wherein the rate matching resources are associated with a Long Term Evolution (LTE) demodulation reference signal, an LTE cell-specific reference signal, a zero power channel state information reference signal (CSI-RS) associated with LTE CSI-RS resources, or any combination thereof.

12. The method of claim 1, further comprising:
identifying, in the indication, a configuration associated with a rate matching pattern for one or more reference signals configured for transmission in the set of resources, wherein the rate matching pattern is based at least in part on a first numerology associated with the first radio access technology and a second numerology associated with the second radio access technology, and wherein performing the first communication with the network device is further in accordance with the rate matching pattern.

13. A method for wireless communications at a network device, comprising:
determining a spatial division multiplexing configuration for dynamic spectrum sharing communications with one or more first user equipments (UEs) communicating via a first radio access technology and with one or more second UEs communicating via a second radio access technology;
transmitting, to at least the one or more first UEs, an indication of a set of resources associated with a spatial division multiplexing configuration to be used for the dynamic spectrum sharing communications, wherein the spatial division multiplexing configuration comprises interference measurement resources for the set of resources, rate matching resources for the set of resources, or both;
transmitting, to at least the one or more first UEs, a notification that the first communication applies the spatial division multiplexing configuration; and
performing, based at least in part on the notification, the first communication on the set of resources via a first spatial layer associated with the first radio access technology in accordance with the spatial division multiplexing configuration and a second communication between the one or more second UEs and the network device via the second radio access technology on a second spatial layer associated with the second radio access technology, the first communication being multiplexed on the set of resources with the second communication.

14. The method of claim 13, further comprising:
transmitting, via explicit signaling, the notification that the first communication applies the spatial division multiplexing configuration.

15. The method of claim 14, wherein the notification indicates that the first communication with the one or more first UEs via the first radio access technology is multiplexed with the second communication with the one or more second UEs via the second radio access technology in accordance with the spatial division multiplexing configuration.

16. The method of claim 14, wherein the notification includes a location, a scrambling sequence, a transmission power, or any combination thereof, for one or more reference signals configured for the transmission in the set of resources.

17. The method of claim 13, further comprising:
transmitting, via implicit signaling, the notification that the first communication applies the spatial division multiplexing configuration.

18. The method of claim 13, further comprising:
determining one or more reference signal patterns associated with the set of resources, wherein the one or more reference signal patterns comprise the interference measurement resources, the rate matching resources, or both.

19. The method of claim 18, wherein the one or more reference signal patterns further comprise a set of antenna ports associated with one or more demodulation reference signals shared between the first communication via the first radio access technology and the second communication via the second radio access technology.

20. The method of claim 13, wherein the interference measurement resources are associated with the first communication via the first radio access technology and the second communication via the second radio access technology.

21. The method of claim 13, wherein the interference measurement resources include a New Radio (NR) interference measurement resource, or a resource for measuring interference from a Long Term Evolution (LTE) cell-specific reference signal, an LTE non-zero power channel state information reference signal, an LTE sounding reference signal, or any combination thereof.

22. The method of claim 13, wherein the rate matching resources are associated with a Long Term Evolution (LTE) demodulation reference signal, an LTE cell-specific reference signal, a zero power channel state information reference signal (CSI-RS) associated with LTE CSI-RS resources, or any combination thereof.

23. The method of claim 13, further comprising:
determining a first numerology associated with the first radio access technology and a second numerology associated with the second radio access technology; and
determining a rate matching pattern for one or more reference signals configured for transmission in the set of resources based at least in part on the first numerology and the second numerology, wherein the indication comprises a configuration associated with the rate matching pattern.

24. The method of claim 23, wherein the rate matching pattern comprises a New Radio (NR) demodulation reference signal rate matching pattern associated with interference between the first communication via the first radio access technology and the second communication via the second radio access technology.

25. The method of claim 13, further comprising:
puncturing one or more resource elements of the set of resources based at least in part on interference between the first communication via the first radio access technology and the second communication via the second radio access technology.

26. An apparatus for wireless communications, comprising:
a processor;
memory coupled with the processor; and
instructions stored in the memory and executable by the processor to cause the apparatus to:
receive, from a network device, an indication of a set of resources to be used for dynamic spectrum sharing communications with the network device;
determine, based at least in part on the indication, a spatial division multiplexing configuration comprising interference measurement resources for the set of resources, rate matching resources for the set of resources, or both;
receive a notification that a first communication between the UE and the network device applies the spatial division multiplexing configuration; and
perform, based at least in part on the notification, a first communication on the set of resources via a first spatial layer associated with the first radio access technology in accordance with the spatial division multiplexing configuration, the first communication being multiplexed on the set of resources with a second communication between a second apparatus and the network device via a second radio access technology using a second spatial layer associated with the second radio access technology.

27. An apparatus for wireless communications, comprising:
a processor;
memory coupled with the processor; and
instructions stored in the memory and executable by the processor to cause the apparatus to:
determine a spatial division multiplexing configuration for dynamic spectrum sharing communications with one or more first user equipments (UEs) communicating via a first radio access technology and with one or more second UEs communicating via a second radio access technology;
transmit, to at least the one or more first UEs, an indication of a set of resources associated with a spatial division multiplexing configuration to be used for the dynamic spectrum sharing communications, wherein the spatial division multiplexing configuration comprises interference measurement resources for the set of resources, rate matching resources for the set of resources, or both;
transmit, to at least the one or more first UEs, a notification that a first communication applies the spatial division multiplexing configuration; and
perform, based at least in part on the notification, the first communication on the set of resources via a first spatial layer associated with the first radio access technology in accordance with the spatial division multiplexing configuration and a second communication between the one or more second UEs and the apparatus via the second radio access technology on a second spatial layer associated with the second radio access technology, the first communication being multiplexed on the set of resources with the second communication.

* * * * *